(12) United States Patent
Sinha

(10) Patent No.: US 10,911,806 B1
(45) Date of Patent: Feb. 2, 2021

(54) TECHNIQUES FOR PROVIDING DIGITAL CONTENT RECOMMENDATIONS

(71) Applicant: Amazon Technologies, Inc., Seattle, WA (US)

(72) Inventor: Charu Sinha, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 182 days.

(21) Appl. No.: 16/150,052

(22) Filed: Oct. 2, 2018

(51) Int. Cl.
*H04N 21/25* (2011.01)
*H04N 21/442* (2011.01)
*H04N 21/258* (2011.01)

(52) U.S. Cl.
CPC ..... *H04N 21/251* (2013.01); *H04N 21/25891* (2013.01); *H04N 21/44204* (2013.01); *H04N 21/44222* (2013.01)

(58) Field of Classification Search
CPC ........... H04N 21/251; H04N 21/25891; H04N 21/44222; H04N 21/44204
See application file for complete search history.

(56) References Cited

U.S. PATENT DOCUMENTS

| 2015/0370818 | A1* | 12/2015 | Des Jardins | .......... G06F 16/435 707/734 |
| 2020/0007916 | A1* | 1/2020 | Keen | ................... H04N 21/2387 |
| 2020/0267421 | A1* | 8/2020 | Gang | ................... H04N 21/235 |

* cited by examiner

*Primary Examiner* — Hai V Tran

(74) *Attorney, Agent, or Firm* — Kilpatrick Townsend & Stockton LLP

(57) ABSTRACT

Techniques are disclosed for providing recommendations related to digital content. In some embodiments, historical content data may be analyzed to identify abandonments by a plurality of user devices with respect to viewing digital content. The historical content data may indicate viewing behavior associated with the plurality of user devices and the digital content. An index within the digital content may be calculated based at least in part on the abandonments. For example, the index may correspond to a time within the digital content at which a percentage of the plurality of user devices that abandoned the digital content feel below a threshold value. A recommendation related to the digital content may be provided comprising an indication of the index determined for the digital content.

20 Claims, 8 Drawing Sheets

US 10,911,806 B1

TECHNIQUES FOR PROVIDING DIGITAL CONTENT RECOMMENDATIONS

BACKGROUND

Users often enjoy a variety of digital content such as television shows, movies, e-books, audio books, video games, and the like. It may be the case that a user begins interacting with particular digital content such a television series, but isn't particularly enthralled with the show. The user may abandon the content and redirect his focus to other content, without ever knowing whether he would have eventually become more interested in the show. This can indicate that the content was ineffective and/or inaccurate with respect to the user. In some cases, the user may jump from content to content searching for engaging subject matter which can lead to a frustrating user experience.

BRIEF DESCRIPTION OF THE DRAWINGS

Various embodiments in accordance with the present disclosure will be described with reference to the drawings, in which.

DETAILED DESCRIPTION

Figure 1:
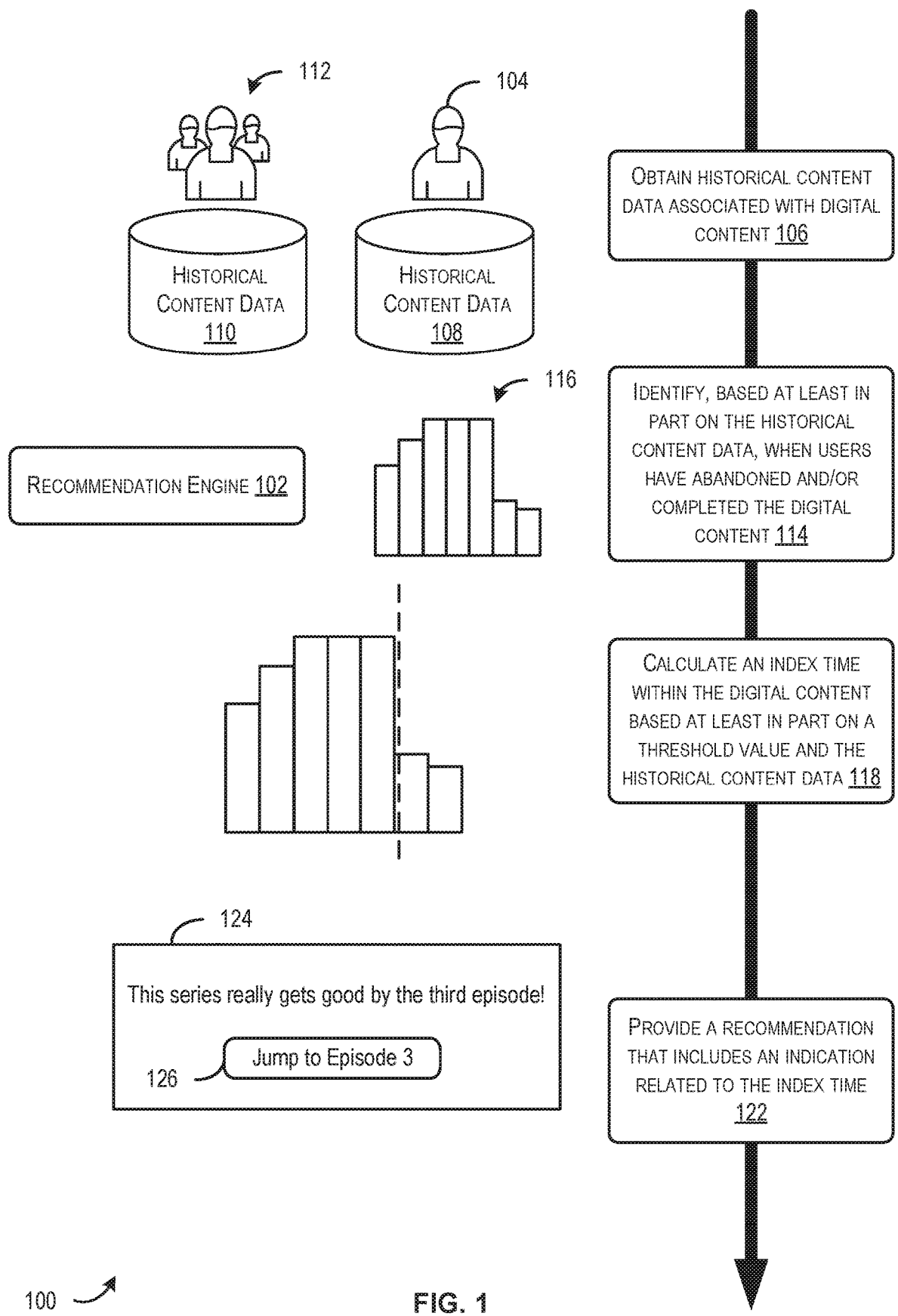
FIG. 1 illustrates a flow for providing recommendations related to digital content, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to systems and methods for providing recommendations related to digital content (e.g., a television show, a television season or series, one or more movies, one or more electronic books, one or more audio books, etc.). In some embodiments, an application (e.g., a web browser, a shopping application, etc.) of a user device may be utilized to navigate to a provider of digital content (e.g., an electronic marketplace provider). The user may utilize any suitable interface for selecting and viewing digital content. By way of example, a user may navigate to an item detail page associated with television series A to make a selection to begin viewing (e.g., streaming) episode 1, season 1, of television series A. Sometime later, perhaps only a portion of the way through episode 1, or during another episode, the user may abandon the digital content (e.g., as indicated by exiting from the streaming interface, closing a streaming application/web browser, selecting different (unrelated) digital content, failing to resume viewing for some threshold period of time, etc.). The system may provide a recommendation to the user device at any suitable time indicating that other users found the television episode/season/series more engaging after a particular point (also referred to as an "index time"). For example, a user attempting to exit a particular episode may be provided a recommendation that other users found that episode to be more engaging after 15 minutes into the episode. As another example, the recommendation may indicate that other users found the season and/or series to be more engaging after the fourth episode of season 1, after season 2, or the like. In some embodiments, the notification may include a selectable option to jump to a particular running time, episode, season, corresponding to the recommendation. In some embodiments, the recommendation may be provided to the user device during a particular viewing session, after abandoning the viewing session, or at any suitable time. By way of example, a recommendation may be provided in an email that is sent after a threshold time period has elapsed after the content was last viewed (e.g., a few days after the user stopped viewing the content).

By utilizing the recommendations and techniques discussed herein, not only can more accurate and/or effective content be suggested to user, but such recommendations may be provided in a manner that increases the efficiency of finding content in which the user may be likely to be interested. In situations in which the user was not initially enthralled by the content, these recommendations may eliminate and/or reduce the need for further searches for additional content to be performed. Additional searches might require additional navigation processing (e.g., network page serves) and/or search query processing, either of which might result in delay in identifying content of interest. In some embodiments discussed herein, the index time (e.g., the point at which users historically have found the content engaging) that is provided in the recommendation may be preprocessed even before the particular user ever discovers and/or views the content. By providing these preprocessed index times, the recommendations discussed herein can increase the likelihood that a user maintains an interest in particular content. Accordingly, such recommendations can also reduce the likelihood that the user conducts additional browsing and/or searching for additional content. By reducing the likelihood of further browsing/searching, the techniques described herein may cause a reduction in the computational burden of the content provider (e.g., an electronic marketplace at which the digital content is provided for consumption).

It should be appreciated that similar techniques to those discussed herein may be applied to any suitable type of digital content. For example, upon determining that a user is attempting to abandon (or has already abandoned) particular digital content (e.g., an episode, a season, a series, a movie, a book, an audio book, etc.), a notification (e.g., an email, a text message, a push notification, a pop-up window, etc.)

may be provided to indicate to the user an index time (e.g., a running time, a video game play time, an episode number, a season number, a page number, etc.) by which most users become engaged in the digital content (e.g., the point by which some threshold (95%) of users who were still viewing the content, continued to view the content until reaching the end of the content).

As a non-limiting example, historical content data may be analyzed to determine abandonment data and completion data for a number of user accounts/devices. "Historical content data" may include viewing and/or streaming behavior data (e.g., start times, stop times, resume times, completion indications, etc.), user input related to interacting with content, content selections, reading locations, gameplay times, in-app purchases, or any suitable data associated with one or more users' interactions with particular content. As a non-limiting example, the historical content data may indicate that ten user devices began streaming particular content (e.g., a movie) at various times in the past. The user devices may have continuously streamed the digital content or there may be breaks in the active viewing of the digital content. In some embodiments, a set of abandonment rules may be utilized to identify when users of the user devices can be considered to have abandoned the digital content. By way of example, the set of abandonment rules may indicate that digital content is to be considered abandoned when a user device has not resumed playback of the digital content (and/or related digital content) within a threshold period of time (also referred to as an "abandonment threshold"). The abandonment threshold may be predefined or it may be customized and may indicate a threshold amount of time that may elapse, after which the content may be considered to be abandoned.

When determining a customized abandonment threshold, historical content data for users that started viewing the digital content, stopped viewing the digital content, and resumed viewing the digital content may be analyzed to determine that some percentage (e.g., 90%, 100%, etc.) of those users resumed viewing the digital content within a particular time period (e.g., 168 hours, 1 week, 1 month, etc.). For example, if it is determined that some amount and/or percentage of users (e.g., 95%, 100%, etc.) of users resumed viewing digital content within a week after the digital content was last viewed, the customized abandonment threshold may be set to one week (or a value greater than one week). Subsequently, the customized abandonment threshold of one week may be utilized to identify users that have abandoned the digital content (e.g., have failed to resume viewing the digital content within one week after the most recent viewing of the digital content).

In some embodiments, historical content data of a particular user may be maintained and utilized for a number of purposes. For example, the historical content data may be utilized to characterize the user as being associated with a particular demographic, category, genre, type of content, or the like. As a simplistic example, if a user account is often used to access movies of a particular genre such as "thriller," the user account may be associated with a corresponding label indicating that the user like "thriller" movies. One or more labels/associations of the user account may be utilized to identify historical content data of any number of other users with which digital content abandonment is to be analyzed. By way of example, when determining abandonment rules for a "thriller" movie, historical content data may be utilized from users and/or user accounts that are associated with a label "thriller." Accordingly, abandonment rules for a thriller movie may be based only on historical content data for users who "like" thriller movies (e.g., user accounts who are associated with the "thriller" label).

In some embodiments, abandonment rules may be based at least in part on device type. By way of example, historical content data for particular digital content may be constrained to only data of a particular type of user device (e.g., mobile device, laptop/desktop computer, tablet, etc.). Accordingly, a number of abandonment thresholds for particular digital content may be determined corresponding to different types of user devices. For example, an abandonment threshold for movie A when viewed on a smartphone may be set to particular time period that may be the same or different from an abandonment threshold determined for the same movie when viewed on a desktop computer. Said another way, it may be the case that a user of a smartphone may be considered to have abandoned viewing movie A after ten minutes since the user stopped viewing the movie, while a user of a desktop may be considered to have abandoned the same movie after twenty minutes.

Embodiment discussed herein may provide numerous benefits over conventional recommendation systems. For example, the recommendations disclosed herein provide the user information related to when other users seemingly became engaged with particular digital content. Thus, a user who may be experimenting with unfamiliar content may be informed that he might find the content more interesting after a particular point in the content. User interface elements may be provided to navigate the user that point should he desire, enabling the user to find content that may interest him in a more efficient manner. The recommendations provided may be device specific, content specific, geography-specific, and/or may be determined based on user-specific information and/or historical content data associated with many users. Accordingly, the process for determining index times for particular content may be tailored to apply to a specific user utilizing information that is most likely to apply to that particular user. The system, method, and processes described herein may provide content recommendations based at least in part on a likelihood that the user may eventually become engaged in the content. Accordingly, the user's experience is improved by providing these tailored content recommendations to enable the user to more efficiently find content with which he may become engaged.

FIG. 1 illustrates a flow 100 for providing recommendations related to digital content, in accordance with at least one embodiment. The operations described in flow 100 may be performed by recommendation engine 102. Recommendation engine 102 may operate on a particular user device (e.g., a user device associated with user 104) and/or the recommendation engine 102 may operate on a remote device such as a server computer configured to provide the functionality of the recommendation engine 102. In some embodiments, the user 104 and/or the users 112 may be consumers of an electronic marketplace from which the digital content is provided (e.g., purchased, streamed, accessed, etc.).

The flow 100 may begin at 106, where historical content data associated with digital content may be obtained. In some embodiments, the historical content data obtained may include historical content data 108 associated with user 104 and/or the historical content data obtained may include historical content data 110 associated with any suitable number of other users 112. The historical content data 108 and/or the historical content data 110 may be provided by and/or obtained from any suitable user device associated with the user 104 and/or users 112, respectively. In some embodiments, the recommendation engine 102 (or another component and/or system) may be configured to collect and maintain the historical content data 108 and/or the historical content data 108. For example, as users 112 and/or the users 104 interact with various content, the historical content data may be collected and stored in any suitable storage location for future processing. In some embodiments, the historical content data 108 and/or the historical content data 110 may be associated with a user account of the user 104 and/or users 112, respectively.

As described above, the historical content data for a user may include any suitable viewing and/or streaming behavior data (e.g., start times, stop times, resume times, completion indications), user input related to interacting with content, content selections, reading locations, gameplay times, in-app purchases, or any suitable data associated with one or more users' interactions with particular content. For example, if the digital content is a movie, historical content data 110 may include start times, stop times, resume times, device data (e.g., device type, serial number, model number, etc.), navigation behavior (e.g., fast forwards, rewinds, scene jumps, etc.), completion indications indicating that the content was viewed to completion (e.g., the user watched substantially the whole movie such as to the end scene, until the end credits began rolling, within a threshold time before an end time associated with the movie, etc.) that is associated with the users 112. Historical content data 110 for a television show may include start times, stop times, resume times, device data (e.g., device type, serial number, model number, etc.), navigation behavior (e.g., fast forwards, rewinds, scene jumps, etc.), completion indications indicating that the content was viewed to completion (e.g., the user watched substantially a whole episode such as to the end scene, until the end credits began rolling, within a threshold time before an end time associated with the episode, etc.) that is associated with the users 112. Historical content data 110 for with a television show may include data that is specific to an episode, a season, and/or a series related to the television show. Historical content data 110 for an electronic book may include start times, stop times, resume times, device data (e.g., device type, serial number, model number, etc.), page access information, completion indications indicating that a last page of the electronic book was accessed (e.g., accessed and/or accessed over a threshold period of time indicating that the page was read). Historical content data 110 for an audio book may include start times, stop times, resume times, device data (e.g., device type, serial number, model number, etc.), and/or completion indications indicating that the user listened to substantially the whole book (e.g., a particular time within the audio file was reached, the user listened to a run time occurring within a threshold period of time before an end time for the audio file, etc.) or the like. Historical content data 110 for a video game and/or a gaming application may include start times, game play running times, device data (e.g., device type, serial number, model number, etc.), levels reached, storyline scenes reached, start times, stop times, resume times, purchases made via the video game and/or gaming application, or the like. Generally, historical content data 110 may include any suitable data related to user interactions with particular content. Similarly, historical content data 108 may include any of the aforementioned data corresponding to any suitable digital content as it related to interactions conducted by the user 104.

In some embodiments, the historical content data 110 may be identified based at least in part on one or more attributes associated with the user 104 and/or the users 112. For example, the recommendation engine 102 (or another component and/or system) may be configured to associate the user 104 with any suitable label. By way of example, user account information (e.g., indicating name, address, contact information, past-purchase information, or the like) and/or historical content data associated with any/all content with which the user 104 has interacted (e.g., including historical content data 108) may be utilized to identify various attributes of the user 104. In some examples, these attributes may include demographic information such as age, gender, race, profession, education, or the like. These attributes may additionally or alternatively include attributes identifying content preferences of the user 104. For example, the user 104 may often (over a threshold number of times, perhaps over a particular period of time) watch horror movies and based on this type of behavior, the recommendation engine 102 (or another system) may associate the user 104 with the attribute "horror" indicating that the user seemingly enjoys watching movies that are associated with the genre "horror." These attributes may be content type specific and/or the attributes may apply across content types. For example, one attribute may indicate that the user 104 enjoys "horror" movies, while another attribute may indicate that the user 104 enjoys "political memoir" books. In some embodiments, a particular attribute may be associated with more than one content type. By way of example, the user 104 may be associated with an attribute that indicates that the user 104 enjoys "horror" content, such as "horror" movies, "horror" electronic and/or audio books, "horror" related video games, or the like. Other attributes that may be associated with the user 104 and/or the users 112 may include device data (e.g., indicating a device type, serial number, model number, etc.) of a device utilized to access the content.

The users 112 may be similarly associated with one or more attributes based at least in part on their respective user account information and respective historical content data (including their respective portion of historical content data 110). Accordingly, in some embodiments, the recommendation engine 102 may be configured to identify the historical content data 110 based on comparing attributes of the user 104 to attributes associated with many users to identify the users 114. Said another way, the recommendation engine 102 may be configured to identify users 112 and the historical content data 110 because the users 112 and/or historical content data 110 pertains to attributes associated with the user 104. This enables the recommendation engine 102 to provide recommendations based on information that more closely pertains to the user 104. As a non-limiting example, the recommendation engine 102 may identify that the user 104 is a "horror" fan. Accordingly, the recommendation engine 102 may identify users 112 as also being horror fans. In some embodiments, the recommendation engine 102 may additionally or alternatively determine that the user 104 is accessing the digital content utilizing a device type (e.g., a smartphone) and may identify users 112 based at least in part on determining that the users 112 also accessed the digital content with smartphones.

At 114, the recommendation engine 102 may be configured to utilize the historical content data 110 (associated with the users 112) to determine when users have abandoned and/or completed the digital content. By way of example, the recommendation engine 102 may generate a distribution 116 based at least in part on the historical content data 110. An abandonment threshold may be determined for the digital content. In some embodiments, the abandonment threshold may be predetermined. That is, abandonment may be inferred when the user stopped viewing the digital content and failed to resume viewing the digital content before a threshold period of time has elapsed (e.g., ten minutes, two months, six months, five days, etc.). In some embodiments, the abandonment threshold may be identified based on the historical content data 110. For example, stop times and resume times may be identified from the historical content data 110. The recommendation engine 102 may be configured to identify that users who have stopped viewing the digital content typically resumed viewing/accessing the digital content within a particular time period. An abandonment threshold for the digital content may be determined based at least in part on this information such that the abandonment threshold is set to be an average time between stopping and resuming the digital content. As another example, the abandonment threshold may be set to be the longest identified period of time which elapsed before a user of the users 112 resumed playing the digital content after stopping.

In some embodiments, the recommendation engine 102 may generate distribution 116 or otherwise analyze the historical content data 110 to determine percentages of the users 112 who abandoned the digital content at various times. By way of example, it may be determined that by five minutes into the digital content, 5% of users 112 abandoned the digital content (e.g., stopped viewing and did not resume viewing within the time period identified as being the abandonment threshold). It may be further determined that by ten minutes within the digital content 10% of the users 112 have abandoned the content, by fifteen minutes, 12% of the users 112 had abandoned the content, and so on.

It should be appreciated that manner in which abandonment thresholds and determinations of abandonment discussed above may be utilized in some embodiments. Additionally, or alternatively, the recommendation engine 102 may analyze completion indications of the historical content data 110 to calculate an index time. For example, the historical content data 110 may be analyzed, and distribution 116 may be generated, to identify that by five minutes into the digital content 5% of the users 112 (e.g., all users 112, or the users who had not yet abandoned) eventually viewed the digital content to completion (e.g., reached an end time associated with the digital content). Similarly, the recommendation engine 102, through this analysis, may identify that by ten minutes into the digital content 15% of the users 112 (e.g., all users 112, or the users who had not yet abandoned) eventually viewed the digital content to completion, by 15 minutes into the digital content 40% of the users 112 (e.g., all users 112, or the users who had not yet abandoned) eventually viewed the digital content to completion, and so on.

At 118, the recommendation engine 102 may be configured to calculate an index time within the digital content. The index time may correspond to a point (e.g., a run time, a play time, a scene, a level, an episode, a page, or the like) at which the percentage (or number) of users who abandon the digital content falls below a threshold value. In some examples, the index time may correspond to a point at which a percentage of users (e.g., all of the users 112 or users of the users 112 who were still viewing the digital content) to eventually completely view the digital content exceeded a threshold.

By way of example, a threshold value may be set to 5%. Accordingly, the recommendation engine 102, utilizing the historical content data 110 (and/or the distribution 116) may identify that by twenty-five minutes into the digital content, the percentage of users 112 that abandoned the digital content fell below 5%. As a specific example, perhaps 23% of users had abandoned the digital content by twenty minutes into the digital content, and by twenty-five minutes 25% of the users 112 abandoned the digital content. Based at least in part on this information, the recommendation engine 102 may identify that an additional 2% of the users abandoned by twenty-five minutes into the digital content and that 2% is less than the threshold value of 5%. Accordingly, the recommendation engine 102 may identify a run time of twenty-five minutes as being the index time.

In some embodiments, an index time may be identified by the recommendation engine 102 based at least in part on identifying a particular point within the digital content by which a percentage of the users 112 (e.g., all users 112, or users of the users 112 who were still viewing the digital content/had not yet abandoned) eventually completed viewing the digital content. Said another way, the recommendation engine 102 may identify a threshold value (e.g., 90%). By analyzing the historical content data 110, the recommendation engine 102 may identify that by 25 minutes into the digital content, 90% of the users 112 who were still viewing the content at that point within the digital content, eventually viewed the digital content to completion. Based at least in part on this determination, the recommendation engine 102 may set the index time to correspond to a run time (e.g., 25 minutes) or another delineator (e.g., a scene, a play time, an episode, a season, a page number, or the like) corresponding to when the threshold (e.g., 90% of remaining users eventually viewed the digital content to completion) was reached.

In some embodiments, the recommendation engine 102 may utilized both the abandonment data and the completion indication to identify/calculate the index time. That is, the distribution 116 may be generated based on identifying times at which users abandoned the digital content as well as identifying times after which some number/percentage of the users 112 eventually completed the digital content.

It should be appreciated that the digital content may be any suitable digital content such as a television episode/season/series, a movie, an electronic book, an audio book, a video game, a game provided by a software application, or the like. In some embodiments, the index time may correspond to any suitable granularity. For example, given that scenario in which the digital content is a television series, the index time may relate to a running time of a particular episode of a television show (e.g., ten minutes into episode 1), a particular episode itself (e.g., episode 2), a particular season (e.g., season 2), or the like.

At 122, a recommendation may be provided (e.g., by the recommendation engine 102) that includes an indication related to the index time. For example, a recommendation 124 may be provided via a webpage associated with the digital content. For example, a user may utilize a user device to navigate to a particular webpage to access the digital content. The analysis described above may have been previously performed to identify an index time corresponding to a third episode of a television season. The recommendation 124 may be provided at the webpage (or network page) to indicate to the user, even before the user begins watching the television show, a point within the television show (e.g., episode 3) at which the user may be likely to become engaged. In some embodiments, the recommendation 124 may include any suitable number and type of graphical elements such as graphical element 126 (e.g., a button) that may provide the user the ability to jump directly to the index time, in this case, episode 3.

It should be appreciated that recommendation 124 is merely one example recommendation and other recommendations are contemplated. For example, a recommendation may be provided via any suitable electronic mechanism (or more than one mechanism) such as via email, via push notification, via an alert or reminder mechanism, via a user account page, via a webpage associated with the digital content, or the like. It is also contemplated that such recommendations may be provided at any suitable time. For example, a webpage for the digital content may provide the recommendation. In other embodiments, the recommendation may be provided as the user is viewing the digital content (e.g., as a popup in the viewing/streaming window, as a notification that is overlaid over a book page, as a popup in a video game, etc.). Additionally, or alternatively, the recommendation may be provided via any of the methods described above after a user (e.g., the user 104) has abandoned, or attempted to abandon, the digital content. Determining that the user 104 has abandoned, or is attempting to abandon digital content may be based on any suitable data such as an indication that the user has closed a browser or digital content application from which the content was being accessed, the user has stopped viewing/accessing content and failed to resume viewing/accessing the content within a threshold period of time, navigation data indicating that the user is navigating away from the content, or any suitable data.

Figure 2:
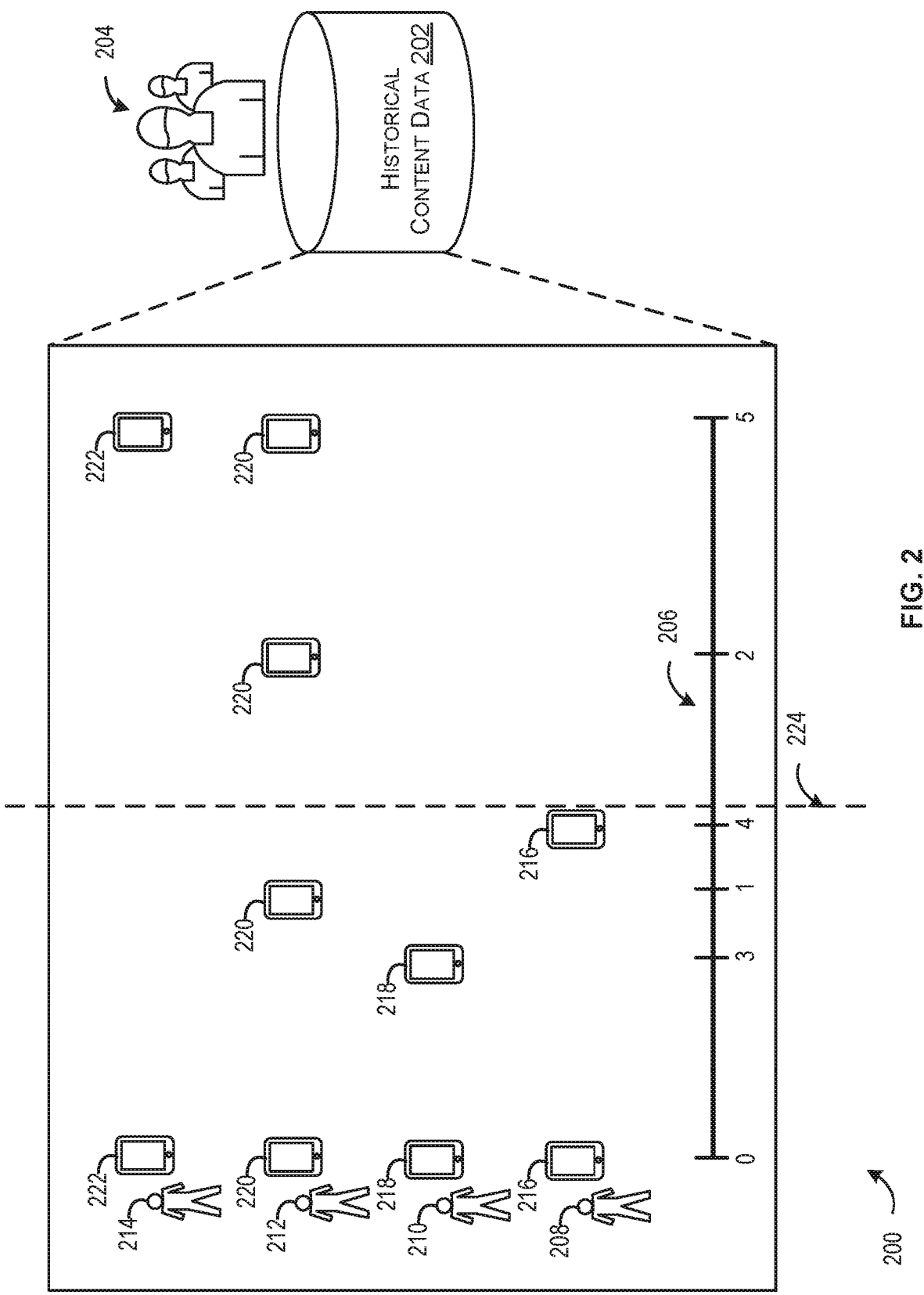
FIG. 2 is a schematic diagram illustrating exemplary techniques for determining an index time for particular digital content from historical content data, in accordance with at least one embodiment.

FIG. 2 is a schematic diagram 200 illustrating exemplary techniques for determining an index time for particular digital content from historical content data 202, in accordance with at least one embodiment. Historical content data 202 may be an example of the historical content data 110 of FIG. 1 associated with users 204. The users 204 may be the same or different users as the users 112 of FIG. 1. The historical content data 202 may correspond to a particular instance of digital content (e.g., a particular movie) or the historical content data 202 may correspond to a number of instances of digital content (e.g., a number of episodes of a television season and/or series). It should be appreciated that the digital content may be any suitable digital content such as a television episode/season/series, a movie, an electronic book, an audio book, a video game, a game provided by a software application, or the like. In some embodiments, the index time may correspond to any suitable granularity. Although the example provided in FIG. 2 may correspond to viewing a movie, it should be appreciated that an index time (e.g., corresponding to a run time, game play time, level, page, episode, season, etc.) may be determined for any suitable digital content.

Progress line 206 may correspond to a particular instance of digital content (e.g., a movie). Index 0 may correspond to a beginning time associated with the digital content while index 5 may correspond to an end time associated with the digital content. Although a movie is used as for illustration purposes in the examples provided within FIG. 2, it should be appreciated that should the digital content be in other forms (e.g., a television episode/season/series, a video game, an electronic book, an audio book, a game provided via a software application, a song/album, etc.) index 0 and/or index 5 may be associated with other delineators. By way of example, index 0 may correspond to a first page (e.g., of a first chapter) of an electronic book while index 5 may correspond to a last page of the electronic book. For an audio book, index 0 may correspond to a run time/playback time of 0:00:00 while index 5 may correspond to an end run time/playback time associated with the end of the audio book file. For a video game, index 0 may correspond to a play time and/or a beginning stage/level, while index 5 corresponds to an end play time and/or end stage/level, or the like. Thus, index 0 may generally refer to a beginning point of the digital content and index 5 may generally refer to an end point of the digital content.

As a non-limiting example, the historical content data 202 may correspond to four users, user 208, 210, 212, and 214. User 208 may have utilized user device 216 to access the digital content (e.g., the instance of digital content corresponding to progress line 206). User 210 may have utilized user device 218 to access the digital content, while user 212 utilized user device 220 and user 214 utilized user device 222 to access to the digital content. At various times, user devices 216-222 may have been utilized to begin accessing the digital content. Returning to the example of a movie. Each of the user devices 216-222 may have been utilized independently to begin playing the movie.

In some embodiments, the historical content data 202 may include indications of start times (or points), stop times (or points), resume times or any suitable data discussed herein as being related to historical content data 202. As an example, the historical content data 202 may indicate that user device 222 began viewing the movie from the beginning from index 0. The movie may have been viewed to a completion point (e.g., a run time) corresponding to index 5 without stopping at any point along the way.

In some embodiments, historical content data 202 may further indicate that the user device 220 began playing the movie from the beginning from index 0. The historical content data 202 may further indicate that the user device 220 was used to stop/pause the content at index 1 (e.g., some portion of the way through the movie, such as twenty minutes through the movie. The historical content data 202 may further include an indication that the user device 220 was used to resume playback of the movie (e.g., perhaps ten minutes, 2 weeks, one hour, etc. after the content was stopped/paused). The historical content data 202 may further indicate that the user device 220 was utilized, one again, to stop/pause the digital content at index 2, corresponding to a point within the movie that occurs after the point of the movie corresponding to index 1. The historical content data 202 may further include an indication that the user device 220 was used (or another device associated with the user 212) was utilized to resume playback some time later (e.g., thirty seconds after the user device 220 was utilized to stop/pause the content).

In some embodiments, historical content data 202 may further indicate that the user device 218 began playing the movie from the beginning from index 0. The historical content data 202 may further indicate that the user device 218 was utilized to stop/pause the digital content at index 3. The historical content data 202 may further indicate that the user device 218 failed to resume playback for a period of time and/or that the digital content was not viewed to completion by the user device 218.

In some embodiments, historical content data 202 may further indicate that the user device 216 began playing the movie from the beginning from index 0. The historical content data 202 may further indicate that the user device 216 was utilized to stop/pause the digital content at index 4. The historical content data 202 may further indicate that the user device 216 failed to resume playback for a period of time and/or that the digital content was not viewed to completion by the user device 218.

In accordance with some embodiments, the recommendation engine 102 of FIG. 1 may be utilized to analyze the historical content data 202. As described in connection with FIG. 1, the historical content data 202 may be utilized to identify index time 224. By way of example, the recommendation engine 102 may generate a distribution from the historical content data 202 indicating points of abandonment and/or points after which completion occurred over a threshold percentage of the time. In some embodiments, the historical content data 202 may be otherwise analyzed potentially without generating a distribution.

For example, the recommendation engine 102 may utilize the indexes 1-4 (corresponding to various stop times of user devices 216-222) and/or the indications of completion (associated with user devices 222 and 220 reaching a point in the movie corresponding to index 5) to determine index time 224. By way of example, the recommendation engine 102 may determine that user device 218 abandoned the digital content at a run time corresponding to index 3 based at least in part on a determination that the user device 218 stopped playing the movie at the run time corresponding to index 3 and failed to resume playback within a threshold period of time. As discussed briefly above, the threshold (e.g., referred to as an abandonment threshold) may be predetermined (e.g., five minutes, two weeks, one year, or the like) or the abandonment threshold may be determined based at least in part on the historical content data 202. Thus, in some embodiments, user devices 216 and 218 may be determined to have abandoned the digital content because upon stopping at index 4 and index 3 respectively, the user devices 216 and 218 failed to resume within the predetermined abandonment threshold of five minutes.

As another example, the abandonment threshold (e.g., a threshold for determining when digital content has been abandoned) may be set to a value corresponding to an average or longest elapsed time period that elapsed after one or more user devices stopped the digital content before resuming playback. By way of example, given that the user device 220 stopped playback at a run time corresponding to index 1, but resumed playback after ten minutes, as well as stopping playback at a run time corresponding to index 2 and resumed playback after twenty minutes, the abandonment threshold may be set to an average (e.g., fifteen seconds) or the abandonment threshold may be set to a longest elapsed time (e.g., twenty seconds) before playback resumed. This recommendation engine 102 may utilize any suitable amount of historical content data 202 corresponding to any suitable number of users 204 when identifying/calculating this abandonment threshold. In some embodiments, the abandonment threshold may be predetermined but modified based at least in part on actual time periods that elapsed between stoppages and playback resuming.

As described above, depending on the particular digital content associated with the historical content data 202, the index time may correspond to a point (e.g., a run time, a play time, a scene, a level, an episode, a page, or the like) at which the percentage (or number) of users who abandon the digital content falls below a threshold value. In some examples, the index time may correspond to a point at which a percentage of users (e.g., all of the users 112 or users of the users 112 who were still viewing the digital content) to eventually completely view the digital content exceeded a threshold.

By way of example, the threshold value (also referred to as an index threshold) may be set to 5%. The recommendation engine 102, utilizing the historical content data 202 (and/or a distribution of the historical content data 202) may identify that by a run time associated with index 3, 25% of the users devices 216-222 had abandoned the digital content. The recommendation engine 102 may further identify from the historical content data 202 (and/or a distribution) that by a run time corresponding to index 4, 50% (or 25% more) of the user devices 216-222 had abandoned the digital content. The recommendation engine 102 may calculate the index time 224 to be the run time corresponding to index 4, or a run time occurring subsequently (some threshold time after the run time corresponding to index 4) based at least in part on a determination that 0% (e.g., an amount under the threshold value of 5%) of users abandoned the digital content after index time 224.

In some embodiments, an index time may be identified by the recommendation engine 102 based at least in part on identifying a particular point within the digital content, whereby after that point was reached in the digital content, a percentage of the user devices 216-222 (or user devices that had not yet abandoned the digital content) eventually completed viewing the digital content. Said another way, the recommendation engine 102 may identify a threshold value (e.g., 90%). By analyzing the historical content data 202, the recommendation engine 102 may identify that once a user device reached a point corresponding to the index time 224, 100% e.g., over the 90% threshold) of user devices that were still viewing the content (e.g., user devices 220 and 222) eventually viewed the digital content to completion (e.g., reached index 5). Based at least in part on this determination, the recommendation engine 102 may set the index time 224 to a value corresponding to a run time or another delineator (e.g., a scene, a play time, an episode, a season, a page number, or the like) that, once reached, resulted in a percentage of the user devices (e.g., user devices that had not previously abandoned the digital content) eventually completing the digital content.

It should be appreciated that the historical content data 202 may be sampled at any suitable time and/or by any suitable frequency to determine the index time either by analyzing abandonments that have happened by that point in the digital content and/or by analyzing how many remaining users eventually completely view the digital content. In some embodiments, the analysis described above may utilize a distribution generated from the historical content data 202. By way of example, the historical content data 202 may be utilized to generate a distribution that indicates percentages of users who have already abandoned and/or percentages of users who eventually completed the digital content. As a non-limiting example, the distribution may be generated to indicate such data at a particular frequency (e.g., every ten seconds of a movie, every level or every 5 levels, every episode/season of a television show, every page of a book or every fifth page of a book or every chapter of a book, and so on). The granularity with which the distribution is generated to describe the abandonment data and/or completion data may be based at least in part on the type of digital content (e.g., movie, television episode/season, electronic book, audio book, video game, music song/album, etc.), length of digital content (e.g., run time, number of pages, levels of the game, etc.), category of the digital content (e.g., horror, thriller, romance, etc.), or the like. By way of example, the distribution generated for a movie may be generated to indicate percentages of users that have abandoned and/or will complete corresponding to every 10 minutes of the movie. By contrast, a television show (having a relatively shorter run time) may be associated with a distribution generated to indicate percentages of users that have abandoned and/or will complete corresponding to every 2 minutes of the television show.

Figure 3:
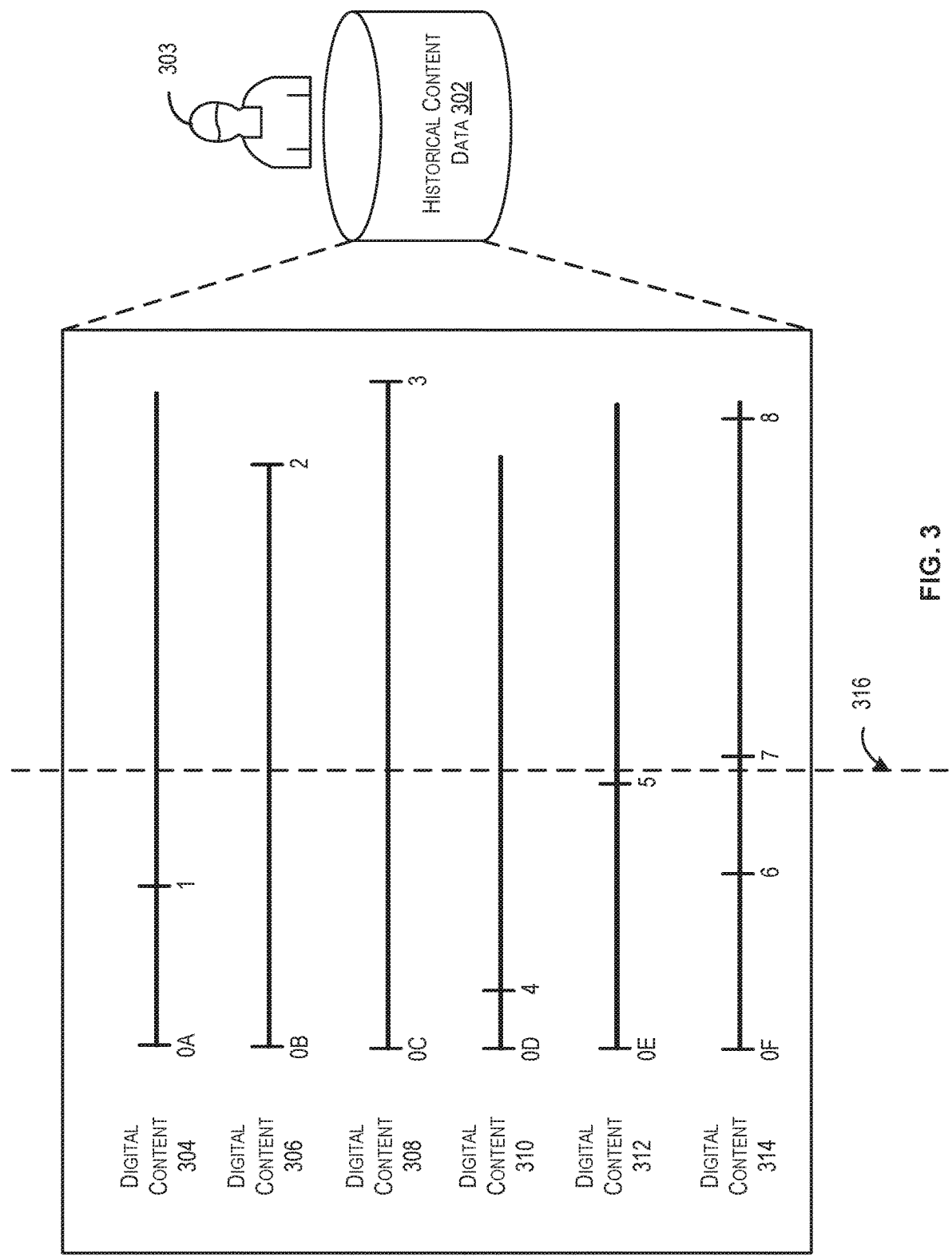
FIG. 3 is a schematic diagram illustrating exemplary techniques for determining abandonment and/or a likelihood of abandonment based at least in part on historical content data associated with a particular user, in accordance with at least one embodiment.

FIG. 3 is a schematic diagram illustrating exemplary techniques for determining abandonment and/or a likelihood of abandonment based at least in part on historical content data 302 associated with a particular user 303, in accordance with at least one embodiment. The historical content data 302 may be an example of the historical content data 108 of FIG. 1 and the user 303 may be the same or different user as the user 104 of FIG. 1. In some embodiments, the historical content data 302 any suitable data associated with access of the digital content by the user 303. This data may include past stop times, start times, resume times, navigation data indicating interactions with a browser/gaming/digital content application such as exiting an application, device data (e.g., device type, serial number, model number, etc.) used to access the digital content associated with the historical content data 302, content navigation data corresponding to fast forwards, scene selections, levels reached, page access information (e.g., what pages were accessed, what was the last page accessed, etc.), and the like. The historical content data 302 may correspond to a single instance of digital content (e.g., one movie, one television episode, one electronic book, one audio book, one video game, one song/album, etc.) or the historical content data 302 may correspond to many instances of digital content (e.g., many movies, and/or many television episodes, and/or many previously read electronic books, and/or many video games, and/or many songs, etc.) such as digital content 304-314. In some embodiments, the historical content data 302 may correspond to a mix of digital content types (e.g., past movies viewed by the user 303, past television shows viewed by the user 303, and/or past books read by the user 303, or the like). As a non-limiting example, digital content 304-314 may collectively correspond to previous movies viewed by a user device of the user 303, previous viewed "horror" content (e.g., digital content corresponding to a particular genre and/or category such as "horror"), previously viewed television episodes/seasons/series, previously read electronic books, previously heard audio books, previously played video games, previously played music (e.g., songs, albums, etc.), or the like.

In some embodiments, the recommendation engine 102 of FIG. 1 may provide one or more recommendations based at least in part on a variety of triggers. One trigger may include determining that the user 303 is actively abandoning the digital content, or is likely to abandon the digital content. In some embodiments, the historical content data 302 may be utilized to identify that the user 303 is abandoning or is likely to abandon the digital content. By way of example, the historical content data 302 may include digital content data individually associated with digital content 304-314. For the purposes of illustration, digital content 304-314 may correspond to previously viewed movies. By way of example, the digital content data associated with the digital content 304 (e.g., previously watched movie A) may indicate that a user device (e.g., a particular smartphone, a particular laptop, etc.) was utilized to start playing the digital content 304 (e.g., movie A) at index OA corresponding to a beginning time associated with the digital content 304. The digital content data associated with digital content 304 may further indicate that the user device was utilized to stop playing the digital content 304 at a point corresponding to index 1 within the digital content 304. In some embodiments, index 1 may correspond to a particular run time (e.g., 30 minutes after the beginning) of the digital content 304. In some embodiments, the digital content 304 may be any suitable type of digital content and index 1 may correspond to a run time, a scene, a level, a page, a song, an episode, a season, or any suitable delineator and/or identifier associated with a particular point within the digital content 304 (e.g., twenty minutes after the beginning of movie A).

In some embodiments, the historical content data 302 may include digital content data corresponding to the digital content 306. That digital content data associated with digital content 306 may indicate that for movie B, a user device associated with the user 303 was utilized to start the movie at index 0B corresponding to a beginning time associated with the digital content 306. The digital content data corresponding to the digital content 306 may further indicate that a user device associated with the user 303 was utilized to view the digital content 306 to completion (e.g., a runtime associated with index 2 was reached). In some embodiments, the digital content 306 may be any suitable type of digital content and the point corresponding to index 2 may correspond to a run time, a scene, a level, a page, a song, an episode, a season, or any suitable delineator and/or identifier associated with a particular point within the digital content (e.g., an end time associated with movie B).

In some embodiments, the historical content data 302 may include digital content data corresponding to the digital content 308. That digital content data associated with the digital content 308 may indicate that for movie C, a user device associated with the user 303 was utilized to start the movie at index 0C corresponding to a beginning time associated with the digital content 308. The digital content data corresponding to the digital content 308 may further indicate that a user device associated with the user 303 was utilized to view the digital content 308 to completion (e.g., to a runtime associated with index 3). In some embodiments, the digital content 308 may be any suitable type of digital content and the point corresponding to index 3 may correspond to a run time, a scene, a level, a page, a song, an episode, a season, or any suitable delineator and/or identifier associated with a particular point within the digital content (e.g., an end time associated with movie C).

In some embodiments, the historical content data 302 may include digital content data corresponding to the digital content 310. That digital content data may indicate that for movie D, a user device associated with the user 303 was utilized to start the movie at index OD corresponding to a beginning time associated with the digital content 310. The digital content data associated with digital content 310 may further indicate that the user device was utilized to stop playing the digital content 310 at a point corresponding to index 4 within the digital content 304. In some embodiments, index 4 may correspond to a particular run time (e.g., ten minutes after the beginning) of the digital content 310. In some embodiments, the digital content 310 may be any suitable type of digital content and the point corresponding to index 4 may correspond to a run time, a scene, a level, a page, a song, an episode, a season, or any suitable delineator and/or identifier associated with a particular point within the digital content (e.g., ten minutes after the beginning of movie D).

In some embodiments, the historical content data 302 may include digital content data corresponding to the digital content 312. That digital content data may indicate that for movie E, a user device associated with the user 303 was utilized to start the movie at index 0E corresponding to a beginning time associated with the digital content 312. The digital content data associated with digital content 312 may further indicate that the user device was utilized to stop playing the digital content 312 at a point corresponding to index 5 within the digital content 312. In some embodiments, index 5 may correspond to a particular run time (e.g., 30 minutes after the beginning) of the digital content 310. In some embodiments, the digital content 312 may be any suitable type of digital content and the point corresponding to index 5 may correspond to a run time, a scene, a level, a page, a song, an episode, a season, or any suitable delineator and/or identifier associated with a particular point within the digital content (e.g., 30 minutes after the beginning of the movie E).

In some embodiments, the historical content data 302 may include digital content data corresponding to the digital content 314. That digital content data may indicate that for movie F, a user device associated with the user 303 was utilized to start the movie at index OF corresponding to a beginning time associated with the digital content 314. The digital content data associated with digital content 314 may further indicate that the user device was utilized to stop playing the digital content 314 at a point corresponding to index 6 within the digital content 314. The digital content data may include an indication of a date and/or time (e.g., 12:34 on Sep. 10, 2018) at which the digital content 314 was stopped at index 6. In some embodiments, the digital content data may include an indication that the viewing/accessing of the digital content 314 resumed at a particular date and/or time (e.g., 12:38 on Sep. 10, 2018). The digital content data may include an indication of a date and/or time (e.g., 1:25 on Sep. 10, 2018) at which the digital content 314 was stopped at index 7. In some embodiments, the digital content data may include an indication that the viewing/accessing of the digital content 314 resumed at a particular date and/or time (e.g., 1:35 on Sep. 10, 2018). In some embodiments, the digital content data corresponding to digital content 314 may further include an indication that a time corresponding to index 8 was reached. The time associated with index 8 may be associated with an end time (e.g., a particular run time associated with the end time) of the digital content 314. In some embodiments, the recommendation engine 102 may determine that the end of the digital content 314 was reached when index 8 is determined to be within a threshold time period (e.g., within five minutes) of a time associated with the end of the movie E and/or when index 8 corresponds with another delineator such as a time associated with the commencement of the end credits of the movie F. In some embodiments, the digital content 314 may be any suitable type of digital content and indexes 6, 7, and/or 8 may individually correspond to a run time, a scene, a level, a page, a song, an episode, a season, or any suitable delineator and/or identifier associated with a particular point within the digital content.

According to some embodiments, the historical content data 302 may be analyzed to determine instances in which the user 303 has abandoned digital content. For example, digital content 304, 310, and 312 may be identified as being abandoned based at least in part on a determination that corresponding end times of that content was never reached/viewed/accessed by the user 303 (or more accurately a user device associated with the user 303) or at least that the end times were not reached within a predetermined threshold period of time (e.g., 30 minutes, one week, two months, etc.) after last stopping the digital content.

In some embodiments, an abandonment threshold may be identified based on identifying elapsed times between times when previously viewed digital content was stopped and times when that same digital content was resumed. By way of example, based on the historical content data 302, it may be determined that the user 303 stopped viewing digital content and resumed viewing of the digital content occurred after 4 minutes (e.g., digital content 314 which was stopped at 12:34 and resumed at 12:38). In another instance, it may be determined that the user 303 stopped viewing digital content and resumed after ten minutes (e.g., digital content 314 was stopped at 1:25 and resumed at 1:35). In some embodiments, an abandonment index 316 for determining when the user 303 has abandoned digital content may be calculated. For example, past time periods elapsing between stopping and resuming may be utilized to calculate an average time period by which the user 303 resumes playback. This average value may be utilized as the abandonment threshold for the user 303. By way of example, given a delay of 4 minutes and a delay of 10 minutes of past digital content resumes, an abandonment threshold for the user 303 may be set to 7 minutes (e.g., corresponding to an average time elapsed before resuming).

As another example, the abandonment threshold for the user 303 may be set to the longest delay before resuming as determined from the historical content data 302. That is, in the ongoing scenario, the abandonment threshold for the user 303 may be set to ten minutes (or a time slightly after ten minutes such as ten minutes, five seconds). This may be based on a determination that the longest time elapsed before the user 303 resumed playback was equal to or approximately ten minutes. Subsequently, when the user 303 stops and/or pauses future digital content, the recommendation engine 102 may identify the user 303 as having abandoned the digital content if the user 303 does not resume playback/access within the amount of time identified by the abandonment threshold (either the predetermined abandonment threshold or the abandonment threshold calculated based at least in part on resume time periods associated with the user 303).

In some embodiments, the historical content data 302 may be further utilized to identify an abandonment index 316 indicating a time (or other suitable delineator/identifier such as a level, a page number, a chapter, a run time, a play time, etc.) by which the user 303 typically abandons digital content. In some embodiments, digital content 304-314 may be the same type of digital content (e.g., movies) although this is not necessarily the case. The historical content data 302 may be analyzed to identify that when the user 303 abandons digital content (e.g., stops viewing/accessing and does not resume with the amount of time identified by the abandonment threshold) he does so prior to a time associated with the abandonment index. By way of example, the historical content data 302 indicates multiple instances of abandonment. For example, digital content 304 was stopped at index 1 (e.g., corresponding to twenty minutes into movie A), digital content 310 was stopped at index 4 (e.g., corresponding to ten minutes into movie D), and digital content 312 was stopped at index 5 (e.g., corresponding to thirty minutes into movie E). In each case, the digital content 304, 310, and 312 were not resumed at all (or at least were not resumed within the threshold amount of time identified by the abandonment threshold). Accordingly, the recommendation engine 102 may take an average or other calculation based at least in part on the stop times indicated by index 1, index 4, and index 5 to determine that when the user 303 abandons digital content, he typically does so by a particular run time of the digital content he was viewing. By way of example, the run times associated with the abandonments (e.g., ten minutes in, twenty minutes in, thirty minutes in) may be utilized to determine that, on average, the user abandons digital content (e.g., movies) within twenty minutes after the run time at which the user began watching the digital content (e.g., the start time, five minutes in, or the like). Accordingly, the abandonment index 316 may be set to a period of 20 minutes. As another example, the stop times indicated by index 1, index 4, and index 5 may be utilized to identify a latest run time at which the user 303 abandoned digital content. Accordingly, the abandonment index 316 may be set to 30 minutes (or just over 30 minutes, such as 31 minutes) as depicted in FIG. 3.

The abandonment index 316 may be determined by the recommendation engine 102 periodically, after obtaining digital content for the user 303, or at any suitable time. Additional historical content data 302 may be continued to be collected for the user 303 over time and the abandonment index 316 may be recalculated based at least in part on the newly collected historical content data 302.

The abandonment index 316 may be utilized by the recommendation engine 102 to provide a recommendation. By way of example, after identifying that the user 303 typically abandons movies by thirty minutes into the movie, the recommendation engine 102 may be configured to provide a recommendation indicating an index time for the movie (e.g., the index time 224 of FIG. 2 as determined from historical content data 202 corresponding to the movie X) within a recommendation. As a non-limiting example, the recommendation engine 102 may provide a recommendation as a pop-up and/or other suitable notification to the user 303 as the user is watching the movie X at any suitable time before the abandonment index 316. For example, the user 303 may begin watching movie X. An index time (e.g., index time 224) previously identified for movie X may indicate that other users have become engaged (percentages of abandonments have dropped below a threshold and/or percentages of eventual completions have exceeded a threshold) after a point within the movie X corresponding to the index time. When the viewing run time of the user 303, of movie X, approaches the abandonment index 316 (e.g., the user 303 is at a run time of 29:30 within movie X and is within some threshold, such as 30 seconds, of the abandonment index 316 of 30 minutes), the recommendation engine 102 may cause a recommendation to be provided to the user 303. By way of example, a recommendation for movie X may be provided as a pop-up notification, push notification, or the like with a viewing window utilized by the user 303 to watch the movie X. The recommendation may indicate, for example, that other users typically became engaged with movie X 45 minutes into the movie. In some embodiments, the recommendation may include any suitable graphical element for advancing the user 303 to a point within movie X corresponding to the index time 224. That is a button, or other suitable graphical element, may be provided via the recommendation to enable the user to jump to a run time of 45:00 into movie X.

It should be appreciated that the abandonment index 316 may be utilized in various embodiments to trigger a recommendation. However, it is equally contemplated that the recommendation may be provided (e.g., via any suitable electronic communication such as email, push notification, alert, reminder, pop-up, or the like) after abandonment (e.g., at a time abandonment is determined, some period of time after abandonment was determined, etc.). Additionally, or alternatively, the recommendation may be provided prior to the user viewing movie X such as when the recommendation is provided at a network page and/or the title screen associated with the movie X.

Figure 4:
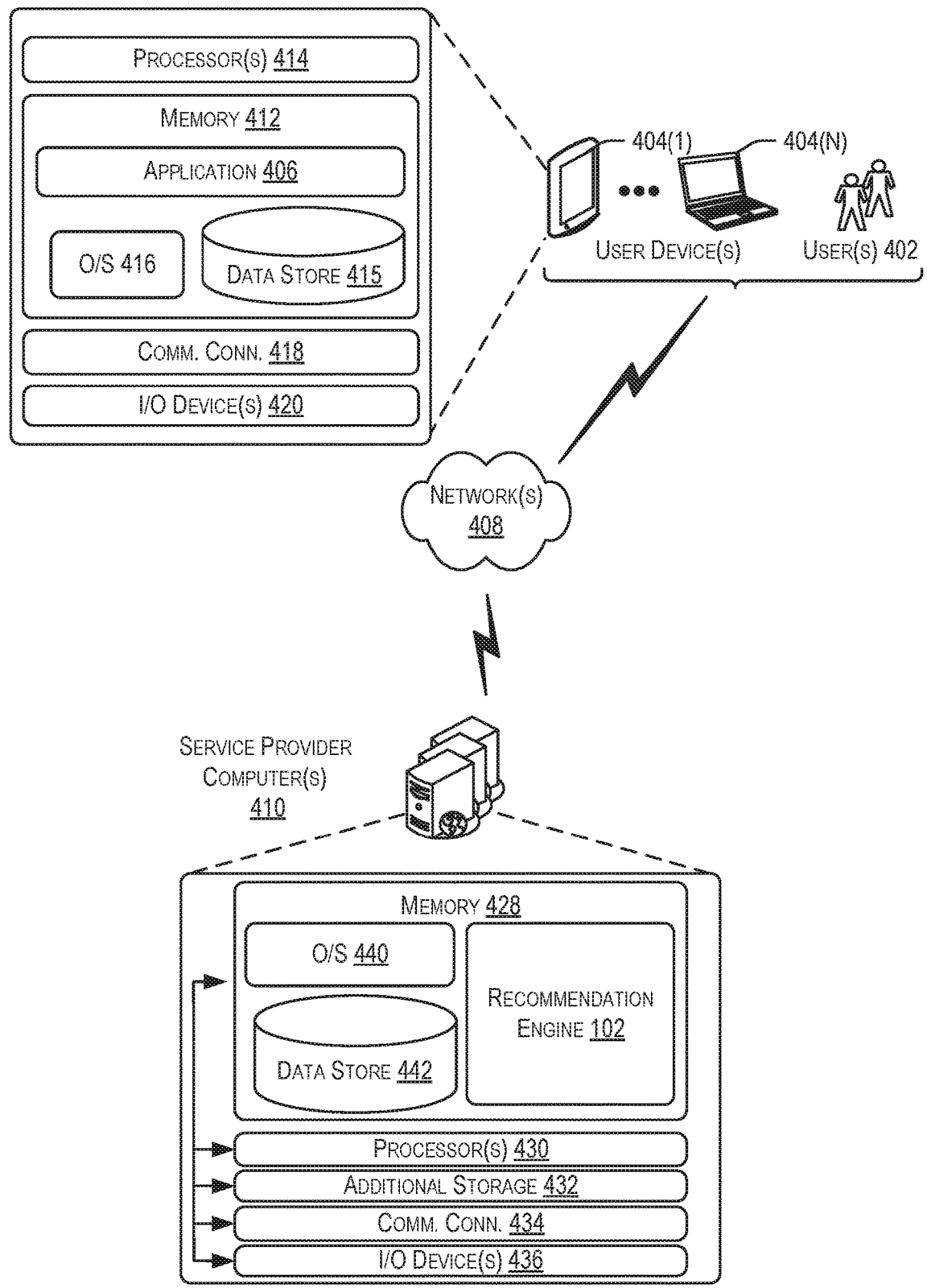
FIG. 4 illustrates components of a recommendation system according to at least one embodiment.

FIG. 4 illustrates components of a recommendation system 400 according to at least one embodiment. In recommendation system 400, one or more user(s) 402 may utilize one or more user device(s) 404(1)-(N) (e.g., any suitable computing device such as a smartphone, a tablet, a laptop, a desktop computer, etc.) to access digital content (e.g., a movie, a television episode/season/series, music such as a song or album, a video game, an electronic book, an audio book, or the like). In some embodiments, the user device(s) 404 may access such digital content via an electronic marketplace hosted by the service provider computer(s) 410. By way of example, the user(s) 402 may utilize the application 406 (e.g., a browser application, a digital content application, a gaming application, an audio player application, a reading application, etc.) to navigate to a content provided by the service provider computer(s) 410 via an electronic marketplace. This content may be previously downloaded to the user device(s) 404 and/or the content may be access via a network page provided by the service provider computer(s) 410. The recommendation engine 102 may, in some embodiments, be a component of the recommendation system 400. In some embodiments, some portion of the recommendation engine 102 may be operate at the user device(s) 404 and/or some portion of the recommendation engine 102 may operate at the service provider computer(s) 410. In some embodiments, the user device(s) 404 and service provider computer(s) 410 may communicate via networks 408 via the application 406 and/or through various application programming interfaces (APIs). In some aspects, the application 406 operating on the user device(s) 404, and/or the APIs, may be hosted, managed, and/or provided by a computing resources service or service provider, such as by utilizing one or more service provider computer(s) 410.

In some examples, the network(s) 408 may include any one or a combination of many different types of networks, such as cable networks, the Internet, wireless networks, cellular networks, and other private and/or public networks. While the illustrated example represents the user(s) 402 accessing application functionality over the network(s) 408, the described techniques may equally apply in instances where the user(s) 402 interact with the service provider computer(s) 410 via the one or more user device(s) 404 over a landline phone, via a kiosk, or in any other suitable manner. It should be appreciated that the described techniques may apply in other client/server arrangements, as well as in non-client/server arrangements (e.g., locally stored applications, etc.).

In some embodiments, the application 406 may provide a network page and/or user interfaces with which the user(s) 402 may select for download and/or access digital content hosted by the service provider computer(s) 410. The application 406 may be configured to provide digital content data indicating viewing/access information associated with the user(s) 402 and the digital content being viewed/accessed. By way of example, if digital content is downloaded and played by the application 406, digital content data (e.g., start times, stop times, resume times, navigation information, page access information (e.g., what pages were accessed, a last page accessed, etc.), levels, scores, run times, video game play times, etc.) may be provided by the application 406 to the service provider computer(s) 410. In some embodiments, such as when the digital content is streamed or otherwise accessed via a network page hosted by the service provider computer(s) 410, the service provider computer(s) 410 may monitor, track, and/or collect digital content data corresponding to the digital content being viewed and/or accessed.

The service provider computer(s) 410, perhaps arranged in a cluster of servers or as a server farm, may host the application 406 operating on the user device(s) 404 and/or cloud-based software services. Other server architectures may also be used to host the application 406 and/or cloud-based software services. The application 406 operating on the user device(s) 404 may be capable of handling requests from the user(s) 402 and serving, in response, various user interfaces that can be rendered at the user device(s) 404. The application 406 operating on the user device(s) 404 can present any suitable type of network page and/or interface that supports user interaction with digital content. The described techniques can similarly be implemented outside of the application 406, such as with other applications running on the user device(s) 404.

The user device(s) 404 may be any suitable type of computing device such as, but not limited to a touch screen device, a smartphone, a personal digital assistant (PDA), a laptop computer, a desktop computer, a thin-client device, a wearable device (e.g., a smart watch), a tablet PC, an electronic book (e-book) reader, a music player device, etc. In some examples, the user device(s) 404 may be in communication with the service provider computer(s) 410 via the network(s) 408, or via other network connections.

In one illustrative configuration, the user device(s) 404 may include at least one memory 412 and one or more processing units (or processor(s)) 414. The processor(s) 414 may be implemented as appropriate in hardware, computer-executable instructions, firmware, or combinations thereof. Computer-executable instruction or firmware implementations of the processor(s) 414 may include computer-executable or machine-executable instructions written in any suitable programming language to perform the various functions described.

The memory 412 may store program instructions that are loadable and executable on the processor(s) 414, as well as data generated during the execution of these programs. Depending on the configuration and type of user computing device, the memory 412 may be volatile (such as random access memory (RAM)) and/or non-volatile (such as read-only memory (ROM), flash memory, etc.). The user device(s) 404 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 412 may include multiple different types of memory, such as static random access memory (SRAM), dynamic random access memory (DRAM), or ROM.

Turning to the contents of the memory 412 in more detail, the memory 412 may include an operating system 416, one or more data stores 415, and one or more application programs, modules, or services for implementing the features of the recommendation engine 102 disclosed herein, provided via the application 406 (e.g., a browser application, a digital content application, an audio player application, a gaming application, an electronic book reading application, etc.). The application 406 may be configured to receive, store, and/or display a network page or other interface for interacting with the service provider computer(s) 410. Additionally, the memory 412 and/or the data store 415 may be configured to store digital content data corresponding to access/viewing information associated with one or more instances of digital content. In some embodiments, the user device(s) 404 may be configured to provide digital content data to the service provider computer(s) 410 at any suitable time for further processing.

The user device(s) 404 may also contain communications connection(s) 418 that allow the user device(s) 404 to communicate with a stored database, another computing device or server (e.g., the service provider computer(s) 410), user terminals and/or other devices on the network(s) 408.

The user device(s) 404 may also include I/O device(s) 420, such as a keyboard, a mouse, a pen, a voice input device, a touch input device, a display, speakers, a printer, etc.

In some aspects, the service provider computer(s) 410 may be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 410 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 410 may be in communication with the user device(s) 404 and/or other service providers via the network(s) 408 or via other network connections. The service provider computer(s) 410 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 410 may include at least one memory 428 and one or more processing units (or processor(s)) 430. The processor(s) 430 may be implemented as appropriate in hardware, computer-executable instructions, firmware, or combinations thereof. Computer-executable instruction or firmware implementations of the processor(s) 430 may include computer-executable or machine-executable instructions written in any suitable programming language to perform the various functions described.

The memory 428 may store program instructions that are loadable and executable on the processor(s) 430, as well as data generated during the execution of these programs. Depending on the configuration and type of service provider computer(s) 410, the memory 428 may be volatile (such as RAM) and/or non-volatile (such as ROM, flash memory, etc.). The service provider computer(s) 410 or servers may also include additional storage 432, which may include removable storage and/or non-removable storage. The additional storage 432 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 428 may include multiple different types of memory, such as SRAM, DRAM, or ROM.

The memory 428, the additional storage 432, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 428 and the additional storage 432 are all examples of computer storage media. Additional types of computer storage media that may be present in the service provider computer(s) 410 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 410. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 410 may also contain communications connection(s) 434 that allow the service provider computer(s) 410 to communicate with a stored database, another computing device (e.g., the user device(s) 404) or server, user terminals and/or other devices on the network(s) 408. The service provider computer(s) 410 may also include I/O device(s) 436, such as a keyboard, a mouse, a pen, a voice input device, a touch input device, a display, speakers, a printer, etc.

Turning to the contents of the memory 428 in more detail, the memory 428 may include an operating system 440, one or more data stores 442, and/or one or more application programs, modules, or services for implementing the features disclosed herein, such as the features provided by the recommendation engine 102.

Figure 5:
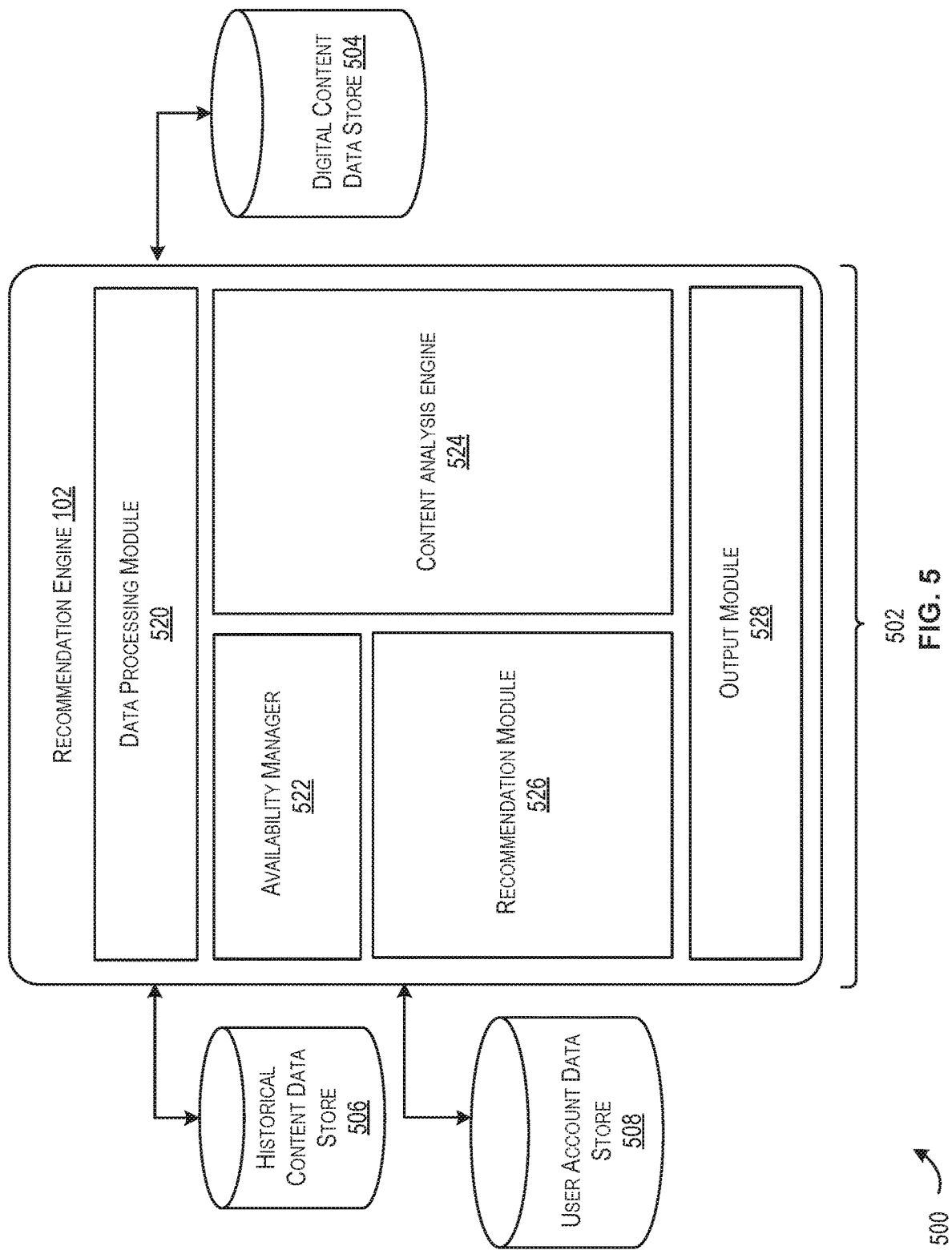
FIG. 5 is a schematic diagram of an example computer architecture for the recommendation engine, including a plurality of modules that may perform functions in accordance with at least one embodiment.

FIG. 5 is a schematic diagram of an example computer architecture for the recommendation engine 102, including a plurality of modules that may perform functions in accordance with at least one embodiment. The modules 502 may be software modules, hardware modules, or a combination thereof. If the modules 502 are software modules, the modules 502 can be embodied on a computer readable medium and processed by a processor in any of the computer systems described herein. It should be noted that any module or data store described herein, may be, in some embodiments, be a service responsible for managing data of the type required to make corresponding calculations. The modules 502 may be exist as part of the recommendation engine 102 operating on the service provider computer(s) 410 of FIG. 4, or the modules may exist as separate modules or services external to the service provider computer(s) 410 (e.g., as part of the application 406 of FIG. 4 operating on the user device(s) 404 of FIG. 4).

In the embodiment shown in the FIG. 5, a digital content data store 504, a historical content data store 506, and a user account data store 508 are shown, although data can be maintained, derived, or otherwise accessed from various data stores, either remote or local to the recommendation engine 102, to achieve the functions described herein. In at least one embodiment, one or more of the data stores described herein may be physically located on the user device(s) 404 of FIG. 4 or alternatively, any suitable combination of the data stores may be operated as part of the service provider computer(s) 510, for example, as part of an recommendation engine 102. The recommendation engine 102, as shown in FIG. 5, includes various modules such as a data processing module 520, a content an availability manager 522, a content analysis engine 524, a recommendation module 526, and an output module 528. Some functions of the modules 502 are described below. However, for the benefit of the reader, a brief, non-limiting description of each of the modules is provided in the following paragraphs.

In at least one embodiment, the recommendation engine 102 includes the data processing module 520. Generally, the data processing module 520 may be utilized to receive any suitable information with respect to any example provided herein. The data processing module 520 may include any suitable number of application programming interfaces with which the functionality of the recommendation engine 102 may be invoked. In some embodiments, the data processing module 520 may be configured to obtain/receive/collect historical content data (e.g., the historical content data 108 and 110 of FIG. 1, the historical content data 202 of FIG. 2 and/or the historical content data 302 of FIG. 3) from any suitable source. In some embodiments, the data processing module 520 may be configured to receive such historical content data from one or more user devices (e.g., the user device(s) 404 of FIG. 4). Additionally, or alternatively, the data processing module 520 may be configured to monitor, track, and/or elicit historical content data corresponding to any suitable digital content accessed by any suitable user device. The historical content data may correspond two one or more users (e.g., users of an electronic marketplace such as users 112 of FIG. 1 and/or users 204 of FIG. 2) may be stored in any suitable location (e.g., the historical content data store 506) for future purposes.

In some embodiments, the data processing module 520 may store and/or associate historical content data with a user account corresponding to a particular user. For example, in some embodiments, the data processing module 520 may be configured to store historical content data of a particular user within a user account (e.g., a record) associated with the user. In some embodiments, the user account may additionally or alternatively store any suitable user account information such as name, address, contact information, billing information, shipping information, demographic information, or the like. In some embodiments, user account information may be managed by the service provider computer(s) 410 of FIG. 4 and accessible to the recommendation engine 102 for any suitable purpose. In some embodiments, the historical content data store 506 may store historical content data that is associated with a particular user and/or a particular user account.

The data processing module 520 may be configured to obtain and store digital content in the digital content data store 504. In some embodiments, the digital content data store 504 may be maintained by the service provider computer(s) 410 of FIG. 4 and accessible to the data processing module 520 (or any suitable module of the modules 502).

In at least one embodiments, the content analysis engine 524 may be configured to calculate an index time (e.g., a point within digital content after which, historically, users seemingly became engaged). As part of the process to calculate an index time, the content analysis engine 524 may select particular historical content data from the historical content data store 506. By way of example, the historical content data may be selected based at least in part on the historical content data being related to particular digital content (e.g., a particular movie, television episode/season/series, an electronic book, an audio file (e.g., an audio book, a song/music album, etc.), a video game, etc.). In some embodiments, the content analysis engine 524 may be further configured to select historical content data based at least in part on one or more attributes of the users to which the historical content data pertains, a geographic region commonly associated with the users to which the historical content data pertains, device data associated with the historical content data, attributes associated with a current user, and the like. For example, if identifying an index time for digital content such as an electronic book X, historical content data pertaining to historical readings of electronic book X may be selected. In some embodiments, historical content data may be selected further based at least in part on such data being associated with playback by a particular type of device (e.g., a smartphone, a laptop, a particular model of smartphone, a video game console, a desktop computer, a tablet PC, etc.). For example, in examples in which a recommendation may be provided to a particular user, the content analysis engine 524 may select historical content data associated with a similar/same device as a user device associated with that particular user and/or a user device that is being utilized to access the digital content.

In some embodiments, an index time may be calculated and eventually provided via a recommendation to a particular user. In these examples, the content analysis engine 524 may be configured to identify historical content data that pertains to users that share one or more attributes of the particular user to which the recommendation will be provided. By way of example, user account information (e.g., indicating name, address, contact information, past-purchase information, or the like) and/or historical content data associated with any/all content with which the particular user has interacted may be utilized to identify various attributes of the user. In some examples, these attributes may include demographic information such as age, gender, race, profession, education, or the like. These attributes may additionally or alternatively include attributes identifying content preferences of the particular user. For example, the user may often (over a threshold number of times, perhaps over a particular period of time) watch horror movies and based on this type of behavior, the content analysis engine 524 may associate the user with the attribute "horror" indicating that the user seemingly enjoys watching movies that are associated with the genre "horror." These attributes may be content type specific and/or the attributes may apply across content types. For example, one attribute may indicate that the user enjoys "horror" movies, while another attribute may indicate that the user enjoys "political memoir" books. In some embodiments, a particular attribute may be associated with more than one content type. By way of example, the user may be associated with an attribute that indicates that the user enjoys "horror" content, such as "horror" movies, "horror" electronic and/or audio books, "horror" related video games, or the like. Other attributes that may be associated with any suitable user may include device data (e.g., indicating a device type, serial number, model number, etc.) of a device utilized to access the content.

Accordingly, in some embodiments, the content analysis engine 524 may be configured to select particular historical content data from the historical content data store 506 based at least in part on comparing attributes of the particular that is to be provided the recommendation and the users associated with the historical content data.

Said another way, the content analysis engine 524, when determine what historical content data to draw from for its calculation of an index time, may limit the historical content data to data that more likely pertains to a particular user and/or the particular digital content. Thus, in some embodiments, not all of the historical content data stored may be utilized to calculate index an index time. Rather, historical content data associated with the particular digital content (e.g., a particular movie) may be utilized. That historical content data may further be filtered to include historical content data that was produced based at least in part on the digital content being accessed by a particular type of device (e.g., utilize only historical content data that resulted from smartphone viewings of the movie). The historical content data may additionally or alternatively be filtered to include historical content data for users that share some attribute with the user (e.g., given that the user is a "horror" fan, utilize only historical content for users who also are fans of "horror"). By providing any or all of these filtering aspects, the content analysis engine 524 may limit the historical content data used to identify an index time to data that may be more likely to apply to the particular user. Thus, the content analysis engine 524 may calculate index times from historical content data of similar users, or accessed by similar devices as the user's device, or the like.

In some embodiments, content analysis engine 524 may be configured to utilize the selected historical content data to determine when users have abandoned and/or completed the digital content. By way of example, the content analysis engine 524 may generate a distribution based at least in part on the selected historical content data. An abandonment threshold may be determined for the digital content. An abandonment threshold may relate to a period of time. A user/user device may be considered to have abandoned digital content once the time period of the abandonment threshold has elapsed since the user/user device last stopped viewing the digital content. In some embodiments, the abandonment threshold may be predetermined. That is, abandonment may be determined when the user stopped viewing the digital content and failed to resume viewing the digital content before a threshold period of time corresponding to the abandonment threshold has elapsed (e.g., ten minutes, two months, six months, five days, etc.). In some embodiments, the abandonment threshold may be identified based on the historical content data. For example, stop times and resume times may be identified from the historical content data. The content analysis engine 524 may be configured to identify that users who have stopped viewing the digital content typically resumed viewing/accessing the digital content within a particular time period. An abandonment threshold for the digital content may be determined based at least in part on this information such that the abandonment threshold is set to be an average time between stopping and resuming the digital content. As another example, the abandonment threshold may be set to be the longest identified period of time which elapsed before a user resumed playing the digital content after stopping.

In some embodiments, the content analysis engine 524 may be configured to generate a distribution and/or the content analysis engine 524 may be configured to otherwise analyze the historical content data. This distribution or other analysis may be utilized to determine percentages of the users who abandoned the digital content at various times. By way of example, it may be determined by the content analysis engine 524 that by five minutes into the digital content, 5% of users had abandoned the digital content (e.g., stopped viewing and did not resume viewing within the time period identified as being the abandonment threshold). It may be further determined by the content analysis engine 524 that by ten minutes within the digital content 10% of the users had abandoned the content, by fifteen minutes, 12% of the users had abandoned the content, and so on.

It should be appreciated that manner in which abandonment thresholds and determinations of abandonment discussed above may be utilized in some embodiments. Additionally, or alternatively, the content analysis engine 524 may be configured to analyze completion indications of the historical content data to calculate an index time. For example, the selected historical content data may be analyzed, and a distribution may be generated that may identify that by five minutes into the digital content 5% of the users (e.g., all users, or the users who had not yet abandoned by that point in the digital content) eventually viewed the digital content to completion (e.g., reached an end point associated with the digital content, substantially reached an end point, reached some point within a threshold of the end point, etc.). Similarly, the content analysis engine 524, through this analysis, may identify that by ten minutes into the digital content 15% of the users (e.g., all users, or the users who had not yet abandoned) eventually viewed the digital content to completion, by 15 minutes into the digital content 40% of the users (e.g., all users, or the users who had not yet abandoned) eventually viewed the digital content to completion, and so on.

In some embodiments, content analysis engine 524 may be configured to calculate an index time for the digital content. The index time may correspond to a point (e.g., a run time, a play time, a scene, a level, an episode, a page, or the like) at which the percentage (or number) of users who abandon the digital content falls below a threshold value. In some examples, the index time may correspond to a point at which a percentage of users (e.g., all of the users or users who were still viewing the digital content) to eventually completely view the digital content exceeded a threshold.

By way of example, a threshold value may be set to 5%. Accordingly, the content analysis engine 524, utilizing the historical content data (and/or a distribution of such data) may identify that by twenty-five minutes into the digital content, the percentage of users that abandoned the digital content fell below 5%. As a specific example, perhaps 23% of users had abandoned the digital content by twenty minutes into the digital content, and by twenty-five minutes 25% of the users abandoned the digital content. Based at least in part on this information, the content analysis engine 524 may identify that an additional 2% of the users abandoned by twenty-five minutes into the digital content and that 2% is less than the threshold value of 5%. Accordingly, the content analysis engine 524 may identify a run time of twenty-five minutes as being the index time.

In some embodiments, an index time may be calculated by the content analysis engine 524 based at least in part on identifying a particular point within the digital content by which a percentage of the users (e.g., all users, or users who were still viewing the digital content/had not yet abandoned) eventually completed viewing the digital content. Said another way, the content analysis engine 524 may identify a threshold value (e.g., 90%). By analyzing the historical content data, the content analysis engine 524 may identify that by 25 minutes into the digital content, 90% of the users 112 who were still viewing the content at that point within the digital content, eventually viewed the digital content to completion. Based at least in part on this determination, the content analysis engine 524 may set the index time to correspond to a run time (e.g., 25 minutes) or another delineator (e.g., a scene, a play time, an episode, a season, a page number, or the like) corresponding to when the threshold (e.g., 90% of remaining users eventually viewed the digital content to completion) was reached.

In some embodiments, the content analysis engine 524 may be configured to utilize both abandonment data and the completion indications to identify/calculate the index time. That is, the distribution generated by the content analysis engine 524 can factor in both times at which users abandoned the digital content as well as times after which some number/percentage of the users eventually completed the digital content. The calculated index time may, in some embodiments, be stored at the digital content data store 504 (e.g., as being associated with the digital content).

In some embodiments, the recommendation module 526 may be configured to identify when a recommendation is to be provided. The recommendation module 526 may be configured to retrieve the index time for particular digital content from the content analysis engine 524 and/or from the digital content data store 504. For example, the recommendation module 526 may receive (via the data processing module 520) a request for a recommendation from a system that hosts the digital content from an electronic marketplace. The recommendation module 526 may be configured to format a notification in any suitable electronic form based at least in part on a number of predetermined recommendation rules. In response to the request, the recommendation module 526 may format and provide the recommendation including the index time in any suitable manner (e.g., via email, text message, to the system that hosts the digital content, by push notification, etc.).

In some embodiments, the recommendation module 526 may be configured to determine that a particular user has abandoned digital content or a likelihood that the user will abandon the digital content based at least in part on historical content data associated with a particular user. The historical content data associated with the user may include past stop times, start times, resume times, navigation data indicating interactions with a browser/gaming/digital content application such as exiting an application, device data (e.g., device type, serial number, model number, etc.) used to access the digital content, content navigation data corresponding to fast forwards, scene selections, levels reached, page access information (e.g., what pages were accessed, what was the last page accessed, etc.), and the like. The historical content data of the user may correspond to a single instance of digital content (e.g., one movie, one television episode, one electronic book, one audio book, one video game, one song/album, etc.) or the historical content data may correspond to many instances of digital content (e.g., many movies, and/or many television episodes, and/or many previously read electronic books, and/or many video games, and/or many songs, etc.). In some embodiments, the historical viewing data may correspond to a mix of digital content types (e.g., past movies viewed by the user, past television shows viewed by the user, and/or past books read by the user, or the like). As a non-limiting example, historical content data may collectively correspond to previous movies viewed by a user device of the user, previous viewed "horror" content (e.g., digital content corresponding to a particular genre and/or category such as "horror"), previously viewed television episodes/seasons/series, previously read electronic books, previously heard audio books, previously played video games, previously played music (e.g., songs, albums, etc.), or the like.

In some embodiments, the recommendation module 526 may be configured to provide one or more recommendations based at least in part on a variety of triggers. One trigger may include determining that the user is actively abandoning the digital content, or is likely to abandon the digital content. In some embodiments, the historical content data may be utilized to identify that the user is abandoning or is likely to abandon the digital content. For the purposes of illustration, the historical content data may correspond to movies that have been previously viewed by the user.

According to some embodiments, the recommendation module 526 may be configured to analyze the historical content data of the user to determine instances in which the user has abandoned digital content. For example, particular digital content may be identified as being abandoned based at least in part on a determination that corresponding end times of that content was never reached/viewed/accessed by the user (or more accurately a user device associated with the user) or at least that the end times were not reached within a predetermined threshold period of time (e.g., 30 minutes, one week, two months, etc.) after last stopping the digital content.

In some embodiments, an abandonment threshold may be identified based on identifying elapsed times between times when previously viewed digital content was stopped and times when that same digital content was resumed. By way of example, based on the historical content data, the recommendation module 526 may be configured to determine that, in one instance, the user stopped viewing digital content and resumed viewing of the digital content occurred after 5 minutes. In another instance, it may be determined that the user stopped viewing digital content and resumed after 15 minutes. In some embodiments, an abandonment threshold for determining when the user has abandoned digital content may be calculated by the recommendation module 526. For example, past time periods elapsing between stopping and resuming may be utilized to calculate an average time period by which the user resumes playback. This average value may be utilized as the abandonment threshold for the user. By way of example, given a delay of 5 minutes and a delay of 15 minutes of past digital content resumes, the recommendation module 526 may calculate the abandonment threshold for the user to be 10 minutes (e.g., corresponding to an average time elapsed before resuming).

As another example, the recommendation module 526 may be configured to set the abandonment threshold to a longest delay that historically occurred before resuming. That is, in the ongoing scenario, the abandonment threshold for the user may be set to 15 minutes (or a time slightly after 15 minutes such as 15 minutes and 5 seconds). This may be based on a determination that the longest time elapsed before the user resumed playback was equal to or approximately 15 minutes. Subsequently, when the user stops and/or pauses future digital content, the recommendation module 526 may be configured to determine that the user has abandoned the digital content if the user does not resume playback/access within the amount of time identified by the abandonment threshold (either the predetermined abandonment threshold or the abandonment threshold calculated based at least in part on resume time periods associated with the user).

In some embodiments, the recommendation module 526 may be further configured to identify an abandonment index indicating a time (or other suitable delineator/identifier such as a level, a page number, a chapter, a run time, a play time, etc.) by which the user typically abandons digital content. The historical content data may be analyzed by the recommendation module 526 to identify that when the user abandons digital content (e.g., stops viewing/accessing and does not resume with the amount of time identified by the abandonment threshold) he does so prior to a time (or other delineator) within the digital content. By way of example, the historical content data may indicate multiple instances of abandonment. The recommendation module 526 may be configured take an average or other calculation based at least in part on the stop times associated with the instances of abandonment to determine that when the user abandons digital content, he typically does so by a particular run time. By way of example, the run times associated with the abandonments (e.g., ten minutes in, twenty minutes in, thirty minutes in) may be utilized to determine that, on average, the user abandons digital content (e.g., movies) within twenty minutes after the run time at which the user began watching the digital content (e.g., the start time, five minutes in, or the like). Accordingly, the recommendation module 526 may set the abandonment index to 20 minutes. As another example, the stop times associated with the instances of abandonment may be utilized to identify a latest run time at which the user abandoned digital content. Accordingly, in some embodiments, the recommendation module 526 may set the abandonment index to that latest run time (e.g., 30 minutes).

The abandonment index may be calculated by the recommendation module 526 periodically, after obtaining digital content for the user, or at any suitable time. Additional historical content data may be continued to be collected for the user over time and the recommendation module 526 may recalculate the abandonment index based at least in part on the newly collected historical content data.

In some embodiments, the recommendation module 526 may be configured to provide a recommendation based at least in part on the abandonment index calculated. The recommendation may indicate an index time for the digital content (e.g., the index time for the digital content as determined by the content analysis engine 524). As a non-limiting example, the recommendation module 526 may provide a recommendation as a pop-up and/or other suitable notification to the user as the user is watching/accessing the digital content at any suitable time before the abandonment index. For example, the user may begin watching movie X. An index time previously identified for movie X may indicate that other users have become engaged (percentages of abandonments have dropped below a threshold and/or percentages of eventual completions have exceeded a threshold) after a point within the movie X corresponding to the index time. When the run time of the user viewing of movie X approaches the abandonment index (e.g., the user is at a run time of 29:30 within movie X and is within some threshold, such as 30 seconds, of the abandonment index of 30 minutes), the recommendation module 526 may be configured to cause a recommendation to be provided to the user. By way of example, a recommendation for movie X may be provided as a pop-up notification, push notification, or the like within a viewing window utilized by the user to watch the movie X. The recommendation may indicate, for example, that other users typically became engaged with movie X 30 minutes into the movie. In some embodiments, the recommendation may include any suitable graphical element for advancing the user to a point within movie X corresponding to the index time. That is a button, or other suitable graphical element, may be provided via the recommendation to enable the user to jump to a run time of 30:00 into movie X.

It should be appreciated that the abandonment index may be utilized in various embodiments to trigger a recommendation. However, it is equally contemplated that the recommendation may be provided (e.g., via any suitable electronic communication such as email, push notification, alert, reminder, pop-up, or the like) after abandonment (e.g., at a time abandonment is determined, some period of time after abandonment was determined, etc.). Additionally, or alternatively, the recommendation may be provided by the recommendation module 526 prior the user viewing movie X such as when the recommendation is provided at a network page and/or title screen associated with the movie X.

In some embodiments, the abandonment threshold calculated by the content analysis engine 524 and/or the abandonment threshold (related to a particular user) as calculated by the recommendation module 526 may further be based at least in part on an availability associated with the digital content. That is to say, when attempting to identify if a user has abandoned digital content, the availability of the digital content may be factored in. In some embodiments, the availability manager 522 may be configured to maintain availability information associated with digital content. In some embodiments, the availability information (e.g., indicating dates by which the digital content is available in a given region/location/country/etc.) may be maintained with the digital content in the digital content data store 504 (e.g., as an association with the digital content of the digital content data store 504). In some embodiments, an operation normally triggered by an abandonment threshold elapsing (e.g., abandonment is inferred for the user) may be delayed based on the availability information. By way of example, it may be the case that the user is watching a television show that is airing weekly. Perhaps the abandonment threshold is set to two days. Accordingly, in some embodiments, the abandonment threshold may be run from the point at which the television show becomes available rather than a last stop time in order to enable the user the opportunity to view the show once it's become available. Thus, in some embodiments, the abandonment threshold determined by the content analysis engine 524 and/or the recommendation module 526 may be started at a date/time at which digital content became/becomes available.

In some embodiments, a recommendation may be provided (e.g., by the recommendation module 526) that includes an indication related to the index time. This recommendation may be provided to the output module 528.

According to some embodiments, the output module 528 may be configured to provide any suitable data from the recommendation engine 102 to any suitable computing device. The output module 528 may be configured to provide any suitable type and/or number of user interface(s) from which the data provided by the recommendation engine 102 may be presented. By way of example, the output module 528 may be configured to transmit recommendation (s) such that those recommendations may be provided via a webpage associated with the digital content. The recommendation 124 may be provided at the webpage (or network page) to indicate to the user, even before the user begins watching the television show, a point within the television show (e.g., episode 3) at which the user may be likely to become engaged. In some embodiments, the output module 528 may be configured to format the recommendation to include any suitable number and type of graphical elements (e.g., a button, edit box, check box, etc.) that may provide the user the ability to jump directly to the index time, in this case, episode 3.

It should be appreciated that the output module 528 may be configured to provide a recommendation via any suitable electronic mechanism (or more than one mechanism) such as via email, via push notification, via an alert or reminder mechanism, via a user account page, via a network page associated with the digital content, or the like. It is also contemplated that such recommendations may be provided at any suitable time. For example, a network pate for the digital content may provide the recommendation. In other embodiments, the recommendation may be provided as the user is viewing the digital content (e.g., as a popup in the viewing/streaming window, as a notification that is overlaid over a book page, as a popup in a video game, etc.). Additionally, or alternatively, the recommendation may be provided via any of the methods described above after a user has abandoned, or attempted to abandon, the digital content. Determining that the user has abandoned, or is attempting to abandon digital content may be based on any suitable data such as an indication that the user has closed a browser or digital content application from which the content was being accessed, the user has stopped viewing/accessing content and failed to resume viewing/accessing the content within a threshold period of time, navigation data indicating that the user is navigating away from the content, or any suitable data.

Figure 6:
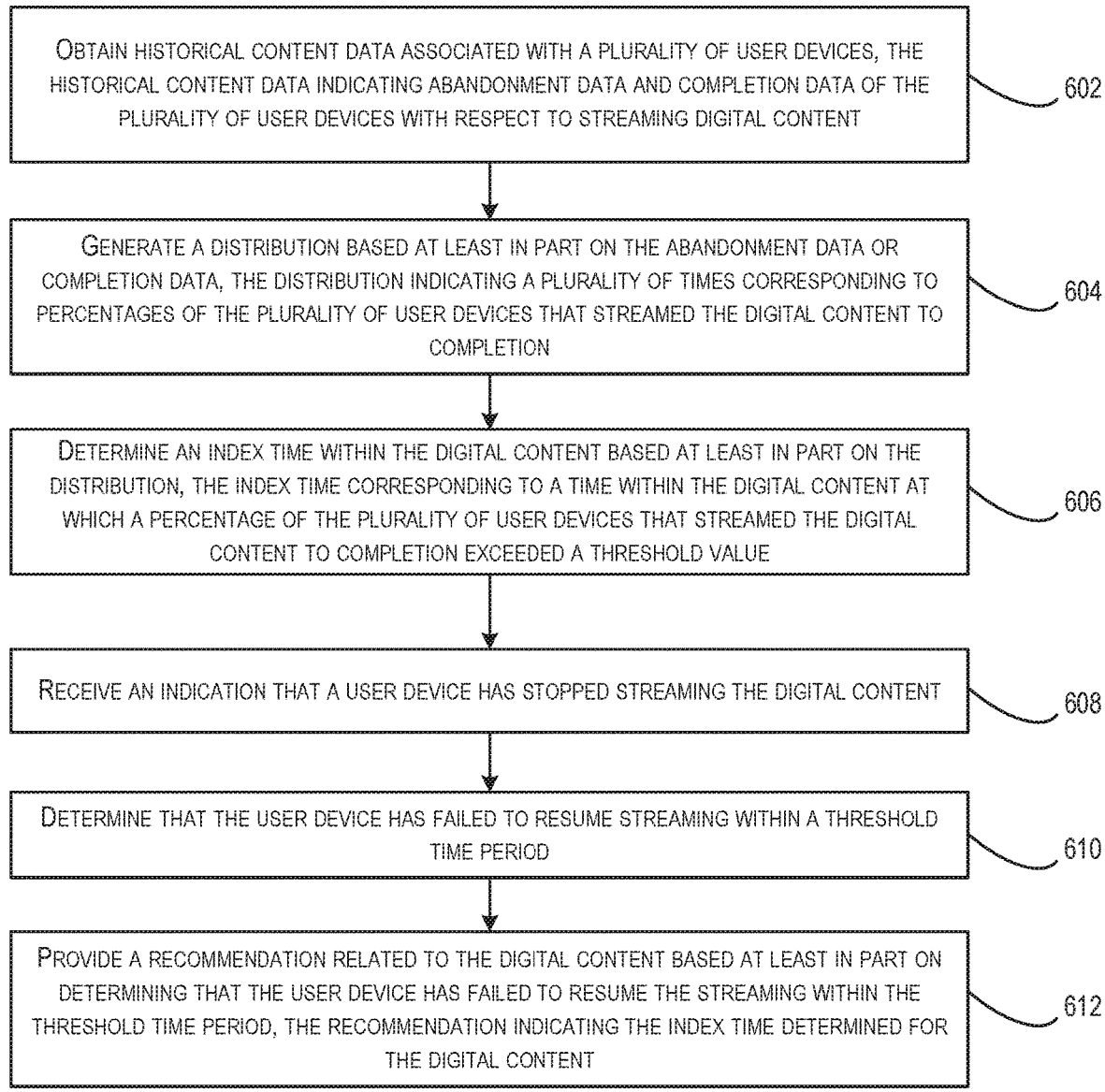
FIG. 6 is a flowchart illustrating an example method for providing a recommendation related to digital content, in accordance with at least one embodiment.

FIG. 6 is a flowchart illustrating an example method 600 for providing a recommendation related to digital content, in accordance with at least one embodiment. It should be appreciated that the operations of the method 600 may be performed in any suitable, not necessarily the order depicted in FIG. 6. Further, the method 600 may include additional, or fewer operations than those depicted in FIG. 6. The operations of method 600 may be performed by a computing device (e.g., the user device(s) 404 of FIG. 4 and/or the service provider computer(s) 410 of FIG. 4) at which at least a portion of the recommendation engine 102 is executed. The computing device may include a processor and a memory storing computer-readable instructions that, upon execution by the processor, configure the computing device to perform the operations of the method 600.

The method 600 may begin at 602 where historical content data associated with the plurality of user devices may be obtained (e.g., by the content analysis engine 524 of FIG. 5). In some embodiments, the historical content data (e.g., the historical content data 110 of FIG. 1) may comprise and/or indicate abandonment data and completion data of the plurality of user devices with respect to streaming digital content.

At 604, a distribution (e.g., the distribution 116 of FIG. 1) may be generated (e.g., by the content analysis engine 524) based at least in part on the abandonment data or completion data. In some embodiments, the distribution may indicate a plurality of times corresponding to percentages of the plurality of user devices that streamed the digital content to completion.

At 606, an index time may be determined (e.g., by the content analysis engine 524) within the digital content based at least in part on the distribution. In some embodiments, the index time may correspond to a time within the digital content at which a percentage of the plurality of user devices that streamed the digital content to completion exceeded a threshold value.

At 608, an indication that a user device has stopped streaming the digital content may be received (e.g., by the recommendation module 526 of FIG. 5).

At 610, it may be determined (e.g., by the recommendation module 526) that the user device has failed to resume streaming within a threshold time period. The threshold time period of time may be predetermined or, in some cases, the threshold time period may be user-specific and determined based at least in part on stop times and resume times of the user's historical content data.

At 612, a recommendation may be provided (e.g., by the output module 528 of FIG. 5) based at least in part on determining that the user device has failed to resume the streaming within the threshold time period. In some embodiments, the recommendation may indicate the index time determined for the digital content.

Figure 7:
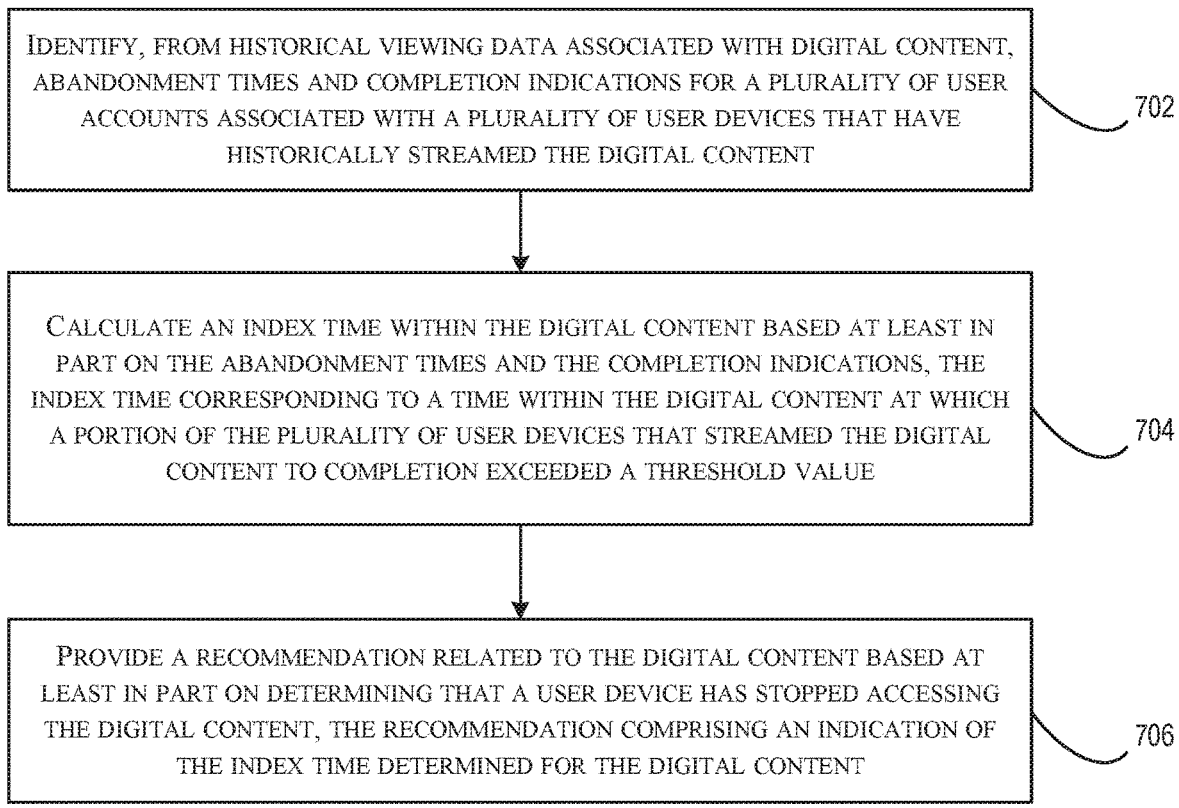
FIG. 7 is a flowchart illustrating another example method for providing a recommendation related to digital content, in accordance with at least one embodiment.

FIG. 7 is a flowchart illustrating another example method 700 for providing a recommendation related to digital content, in accordance with at least one embodiment. It should be appreciated that the operations of the method 700 may be performed in any suitable, not necessarily the order depicted in FIG. 7. Further, the method 700 may include additional, or fewer operations than those depicted in FIG. 7. The operations of method 700 may be performed by a computing device (e.g., the user device(s) 404 of FIG. 4 and/or the service provider computer(s) 410 of FIG. 4) at which at least a portion of the recommendation engine 102 is executed. The computing device may include a processor and a memory storing computer-readable instructions that, upon execution by the processor, configure the computing device to perform the operations of the method 700.

The method 700 may begin at 702, where abandonment times and completion indications may be identified (e.g., by the content analysis engine 524 of FIG. 5) from historical viewing data associated digital content. In some embodiments, the abandonment times and completion indications are identified for a plurality of user accounts associated with a plurality of user devices that have historically streamed the digital content.

At 704, an index time within the digital content may be calculated (e.g., by the content analysis engine 524). In some embodiments, the index time may be calculated based at least in part on the abandonment times and the completion indications. It may be the case that the index time corresponds to a time (or other delineator) within the digital content at which a portion of the plurality of user devices that streamed the digital content to completion exceeded a threshold value.

At 706, a recommendation related to the digital content may be provided (e.g., by the recommendation module 526 via the output module 528) based at least in part on determining that a user device has stopped accessing the digital content. In some embodiments, the recommendation may comprise an indication of the index time determined for the digital content.

Figure 8:
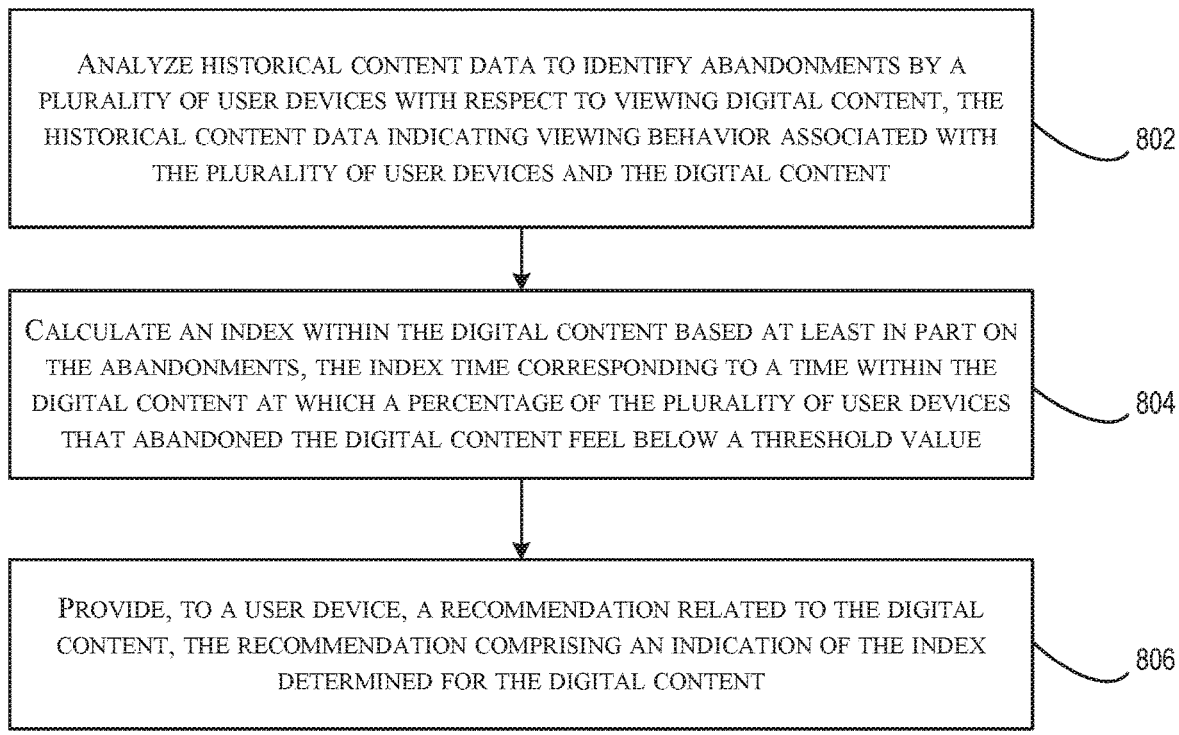
FIG. 8 is a flowchart illustrating yet another example method for providing a recommendation related to digital content, in accordance with at least one embodiment.

FIG. 8 is a flowchart illustrating yet another example method 800 for providing a recommendation related to digital content, in accordance with at least one embodiment. It should be appreciated that the operations of the method 800 may be performed in any suitable, not necessarily the order depicted in FIG. 8. Further, the method 800 may include additional, or fewer operations than those depicted in FIG. 8. The operations of method 800 may be performed by a computing device (e.g., the user device(s) 404 of FIG. 4 and/or the service provider computer(s) 410 of FIG. 4) at which at least a portion of the recommendation engine 102 is executed. The computing device may include a processor and a memory storing computer-readable instructions that, upon execution by the processor, configure the computing device to perform the operations of the method 800. A computer-readable storage medium is disclosed having stored thereon computer-executable instructions that, when executed by a processor, cause the processor to perform the operations of method 800.

The method 800 may being at 802, where historical content data is analyzed (e.g., by the content analysis engine 524 of FIG. 5) to identify abandonments by a plurality of user devices with respect to viewing digital content. In some embodiments, the historical content data may include/indicate viewing behavior associated with the plurality of user devices and the digital content.

At 804, an index within the digital content may be calculated (e.g., by the content analysis engine 524) based at least in part on the abandonments. In some embodiments, the index time corresponds to a time within the digital content at which a percentage of the plurality of user devices that abandoned the digital content fell below a threshold value.

At 806, a recommendation related to the digital content may be provided to a user device (e.g., by the recommendation module 526 via the output module 528 of FIG. 5). In some embodiments, the recommendation may comprise an indication of the index determined for the digital content.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, by a computing system, historical viewing data associated with digital content, the historical viewing data indicating abandonment times and completion indications for a plurality of user accounts associated with a plurality of user devices that have historically streamed the digital content;
   determining, by the computing system, an index time within the digital content based at least in part on the abandonment times and the completion indicators, the index time corresponding to a time within the digital content at which a portion of the plurality of user devices that streamed the digital content to completion exceeded an abandonment threshold value;
   receiving, by the computing system, an indication that a user device has stopped accessing the digital content prior to reaching the index time; and
   providing, by the computing system, a recommendation related to the digital content based at least in part on determining that the user device has stopped accessing the digital content, the recommendation comprising an indicating of the index time determined for the digital content.

2. The computer-implemented method of claim 1, further comprising identifying abandonment times from the historical viewing data, wherein identifying the abandonment times further comprises:
   identifying, from the historical viewing data, respective stop times within the digital content, wherein the respective stop times indicate times at which respective user devices stopped streaming the digital content; and
   determining, from the historical viewing data, the abandonment times based at least in part on identify that the respective user devices failed to resume streaming within a threshold period of time after the respective stop times.

3. The computer-implemented method of claim 2, wherein the digital content comprises one or more television episodes, one or more television seasons, a television series, one or more movies, one or more electronic books, one or more audio files, one or more music files, or one or more video games.

4. The computer-implemented method of claim 1, wherein the recommendation indicates that the digital content becomes more engaging by the index time identified.

5. A computing device, comprising:
   a processor; and
   a memory storing computer-readable instructions that, upon execution by the processor, configure the computing device to:
   identify, from historical viewing data associated with digital content, abandonment times and completion indications for a plurality of user accounts associated with a plurality of user devices that have historically streamed the digital content;
   calculate an index time within the digital content based at least in part on the abandonment times and the completion indications, the index time corresponding to a time within the digital content at which a portion of the plurality of user devices that streamed the digital content to completion exceeded an abandonment threshold value; and
   provide a recommendation related to the digital content based at least in part on determining that a user device has stopped accessing the digital content prior to reaching the index time, the recommendation comprising an indication of the index time determined for the digital content.

6. The computing device of claim 5, wherein the recommendation is provided further based at least in part on determining that the user device has failed to resume accessing the digital content within a threshold time period since the user device stopped accessing the digital content.

7. The computing device of claim 6, wherein the computing device is further configured to:
   identify a plurality of stop indices within the digital content at which a subset of user devices of the plurality of user devices stopped viewing the digital content; and
   identify a plurality of resume indices associated with at least two of the subset of users, the plurality of resume indices indicating that the at least two of the subset of user devices resumed accessing the digital content, wherein the threshold time period is calculated based at least in part a difference between at least one of the stop indices and at least one of the resume indices.

8. The computing device of claim 7, wherein the index time is associated with at least one of: a run time, an episode, a season, a page number, a chapter, a level, or a gameplay time.

9. The computing device of claim 8, wherein the computing device is further configured to:
   obtain user-specific historical content data, the user-specific historical content data being associated with the user;
   identify stop indices and resume indices from the user-specific historical content data, the stop indices indicating a first index time at which the user device stopped viewing a particular instance of digital content of previously-viewed digital content, the resume indices indicating a second index time at which the user device resumed viewing the particular instance of digital content; and
   calculate an individual abandonment threshold value specific to the user, the individual abandonment threshold value being calculated based at least in part on the stop indices and resume indices.

10. The computing device of claim 9, wherein the computing device is further configured to:
    identify that the user device has stopped viewing the digital content; and
    determine that the user device has failed to resume viewing the digital content after a time period corresponding to the individual abandonment threshold value has elapsed since the user stopped viewing the digital content.

11. The computing device of claim 5, wherein the recommendation being provided further configures the computing device to format a user interface to present the recommendation at the user device.

12. The computing device of claim 5, wherein the recommendation is provided by at least one of: a detail network page corresponding to the digital content, a viewing window utilized to view the digital content, a streaming application, an electronic message sent to a user device, a push notification, an alert, or a reminder.

13. The computing device of claim 12, further comprising determining that the user device has abandoned the digital content, wherein abandonment is determined based at least in part on the user device failing to reach a completion index time of the digital content within a threshold time period after the user device stopped accessing the digital content.

14. A non-transitory computer-readable storage medium having stored thereon computer-executable instructions that, when executed by a processor, cause the processor to perform operations comprising:
   identifying, from historical viewing data associated with digital content, abandonment times and completion indications for a plurality of user accounts associated with a plurality of user devices that have historically streamed the digital content;
   calculating an index time within the digital content based at least in part on at least one of: the abandonment times or the completion indications, the index time corresponding to a point within the digital content at which a portion of the plurality of user devices that streamed the digital content to completion exceeded an abandonment threshold value;
   receiving an indication that a user device that was previously accessing the digital content has stopped accessing the digital content prior to reaching the index time; and
   providing, to a user device, a recommendation related to the digital content based at least in part on determining that the user device has stopped accessing the digital content prior to reaching the index time, the recommendation comprising an indication of the index time determined for the digital content.

15. The non-transitory computer-readable storage medium of claim 14, wherein the recommendation is provided based at least in part on a determination that the user device has abandoned the digital content at a particular episode of a television series, and wherein the index time corresponds to a subsequent episode in the television series.

16. The non-transitory computer-readable storage medium of claim 14, wherein the processor performs additional operations comprising:
   identifying an availability of a portion of the digital content with respect to the user device;
   determining that the user device has abandoned the digital content based at least in part on determining that the user device has stopped viewing the digital content and the availability associated with the portion of the digital content, wherein the recommendation is provided further based at least in part on determining that the user has abandoned the digital content.

17. The non-transitory computer-readable storage medium of claim 14, wherein the processor performs additional operations comprising:
   calculating, from user-specific historical content data associated with the user, an abandonment time period by which the user has abandoned previously-viewed digital content; and
   providing the recommendation prior to the abandonment time period elapsing since the digital content was last viewed.

18. The non-transitory computer-readable storage medium of claim 14, wherein the processor performs additional operations comprising providing the indication of the index time within a detail network page from which the digital content may be viewed.

19. The non-transitory computer-readable storage medium of claim 14, wherein analyzing the historical content data is performed prior the user commencing viewing of the digital content.

20. The non-transitory computer-readable storage medium of claim 14, wherein the processor performs additional operations comprising selecting the historical content data based at least in part on determining at least one characteristic associated with each of a plurality of users associated with the plurality of user devices is also associated with the user.

* * * * *